United States Patent
Lin et al.

(10) Patent No.: US 11,861,704 B2
(45) Date of Patent: *Jan. 2, 2024

(54) PERSONA-DRIVEN AND ARTIFICIALLY-INTELLIGENT AVATAR

(71) Applicant: Graphen, Inc., New York, NY (US)

(72) Inventors: Ching-Yung Lin, Scarsdale, NY (US); Danny Lo-Tien Yeh, Tarrytown, NY (US); Yizhou Shen, New York, NY (US); Yihan Wang, New York, NY (US); Yuting An, New York, NY (US); Xinwei Li, New York, NY (US)

(73) Assignee: Graphen, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/719,002

(22) Filed: Apr. 12, 2022

(65) Prior Publication Data

US 2022/0237429 A1 Jul. 28, 2022

Related U.S. Application Data

(63) Continuation of application No. 16/235,601, filed on Dec. 28, 2018, now Pat. No. 11,301,746.
(Continued)

(51) Int. Cl.
*G06Q 40/04* (2012.01)
*G06N 3/006* (2023.01)
(Continued)

(52) U.S. Cl.
CPC ............ *G06Q 40/04* (2013.01); *G06F 18/217* (2023.01); *G06N 3/006* (2013.01); *G06N 5/00* (2013.01); *G06N 3/04* (2013.01)

(58) Field of Classification Search
CPC ....... G06Q 40/04; G06F 18/217; G06F 18/24; G06N 3/006; G06N 5/00; G06N 3/04; G06N 3/044; G06N 20/00
See application file for complete search history.

(56) References Cited

U.S. PATENT DOCUMENTS

| 6,230,111 B1 | 5/2001 | Mizokawa |
| 7,315,827 B2 | 1/2008 | Sloan et al. |

(Continued)

FOREIGN PATENT DOCUMENTS

CN 104881108 8/2018

OTHER PUBLICATIONS

World Intellectual Property Organization, "International Search Report and Written Opinion" issued in International Patent Application No. PCT/US2018/067924, dated Mar. 28, 2019, document of 8 pages.

*Primary Examiner* — Michael Roswell
(74) *Attorney, Agent, or Firm* — Akerman LLP; Ryan Harding

(57) ABSTRACT

A system for providing a persona-driven and artificially-intelligent avatar is disclosed. The avatar may be utilized to represent an artificially-intelligent virtual assistant that may perform actions on behalf of a user, such as actions related to personal shopping for the user. Notably, the avatar may influence artificial intelligence algorithms supporting the functionality of the virtual assistant via quantifiable traits of a persona of the avatar. In particular, the quantifiable traits of the persona of the avatar may be utilized to range bound the controlling parameters of the algorithms such that the virtual assistant represented by the avatar performs actions that conform to the ranged-bounded controlling parameters. Metrics corresponding to the performance of the virtual assistant may be tracked, and the system may modify parameters of the virtual assistant based on the metrics so as to adjust future actions performed by the virtual assistant for the user.

20 Claims, 9 Drawing Sheets

Related U.S. Application Data

(60) Provisional application No. 62/612,383, filed on Dec. 30, 2017.

(51) Int. Cl.
  *G06N 5/00*  (2023.01)
  *G06F 18/21*  (2023.01)
  *G06N 3/04*  (2023.01)

(56) References Cited

U.S. PATENT DOCUMENTS

| | | | |
|---|---|---|---|
| 8,417,614 B1 * | 4/2013 | Mackrell | G06Q 30/0241 705/36 R |
| 9,412,133 B2 | 8/2016 | Howorka | |
| 1,009,375 A1 | 6/2018 | Sites | |
| 2002/0029203 A1 | 3/2002 | Pelland | |
| 2002/0147671 A1 | 10/2002 | Sloan | |
| 2003/0046689 A1 | 3/2003 | Gaos | |
| 2003/0115132 A1 | 6/2003 | Iggland | |
| 2003/0126068 A1 | 7/2003 | Hauk | |
| 2004/0148242 A1 | 7/2004 | Liu | |
| 2005/0027632 A1 | 2/2005 | Zeitoun et al. | |
| 2005/0090911 A1 | 4/2005 | Ingargiola | |
| 2005/0137015 A1 | 6/2005 | Rogers et al. | |
| 2006/0074788 A1 | 4/2006 | Grizack et al. | |
| 2014/0114886 A1 | 4/2014 | Mays | |
| 2014/0136361 A1 | 5/2014 | Brazell | |
| 2014/0310005 A1 | 10/2014 | Brown et al. | |
| 2015/0012467 A1 | 1/2015 | Greystroke | |
| 2015/0142704 A1 * | 5/2015 | London | G06F 16/90332 706/11 |
| 2015/0169284 A1 | 6/2015 | Quast et al. | |
| 2015/0185996 A1 | 7/2015 | Brown | |
| 2015/0254777 A1 | 9/2015 | Beale | |
| 2015/0294405 A1 | 10/2015 | Hanson et al. | |
| 2015/0302436 A1 | 10/2015 | Rynolds | |
| 2016/0300570 A1 | 10/2016 | Gustafson et al. | |
| 2017/0161758 A1 | 6/2017 | Towriss | |

* cited by examiner

|  | Low | High |
|---|---|---|
| Openness | •Less information sources<br>•Less operating financial instruments<br>•Less models<br>•Tend to use traditional models | •More information sources<br>•More instruments<br>•More models<br>•Tend to use new models<br>•Tend to self-improve |
| Conscientiousness | •Less complex models<br>•Random factor leads to breaking the rule | •Complex models<br>•Strictly follow the models<br>•Tend to trade at higher frequency if at higher information acquisition |
| Extroversion | •Tend not to interact with other avatars<br>•Low risk tolerance<br>•Relatively more complex observation module<br>•Tend to trade long term | •Tend to interact with other avatars to get information<br>•Relatively high risk tolerance<br>•Tend to trade short term |
| Agreeableness | •Tend to be competitive among avatars<br>•Tend not to trust other avatars | •Tend to follow herd behavior<br>•Tend to trust information sources |
| Neuroticism | •Tend to calculate risk before an action<br>•Tend to self-improve after a loss | •High random factor that may lead to overtrade |

FIG. 3

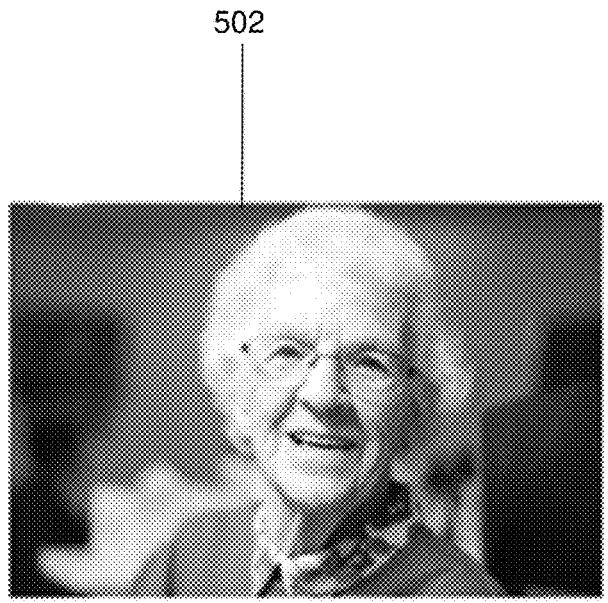
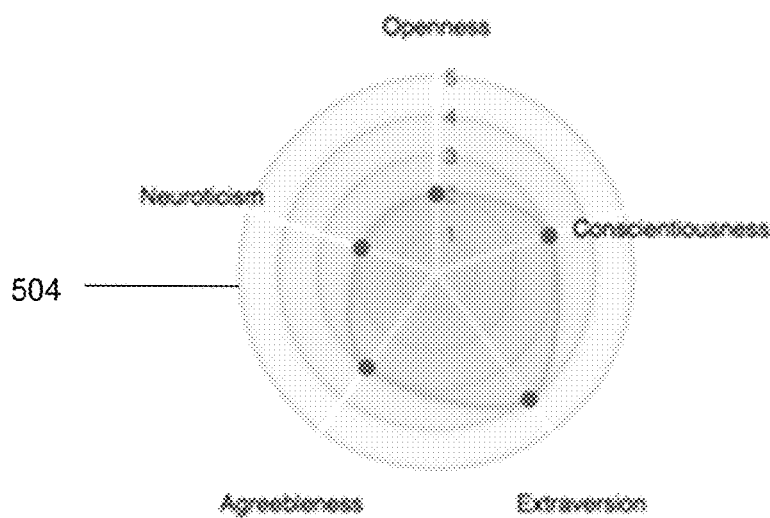
FIG. 5

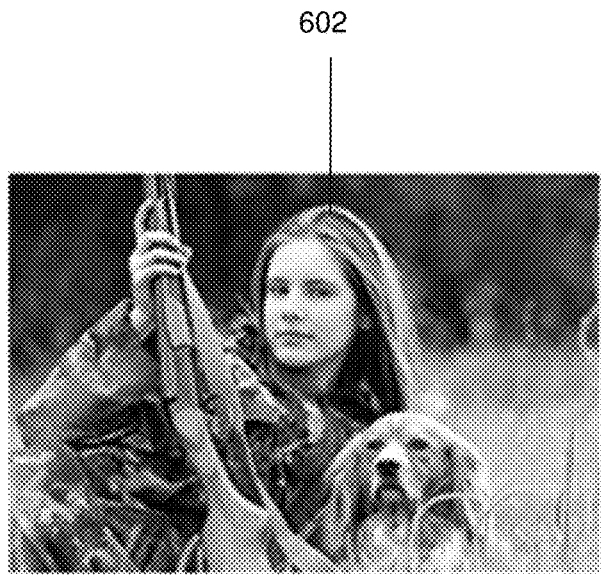
Anita 267139
– an Adventurous AI Trader
*Specialized at:* EUR-USD
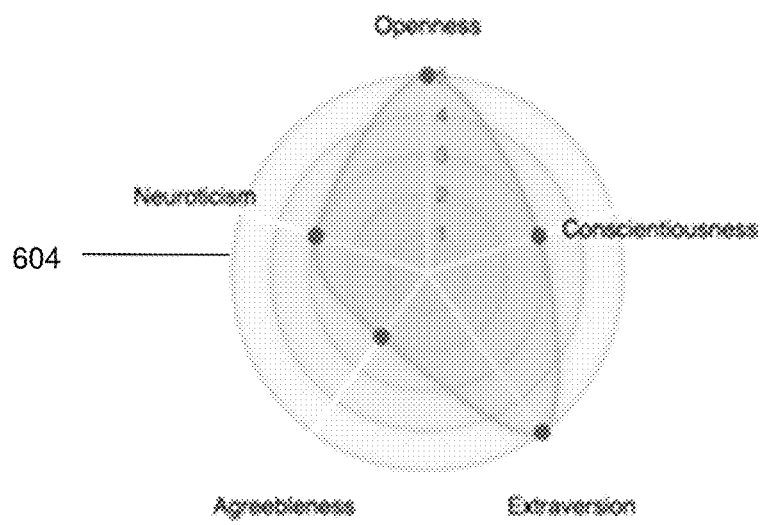
FIG. 6

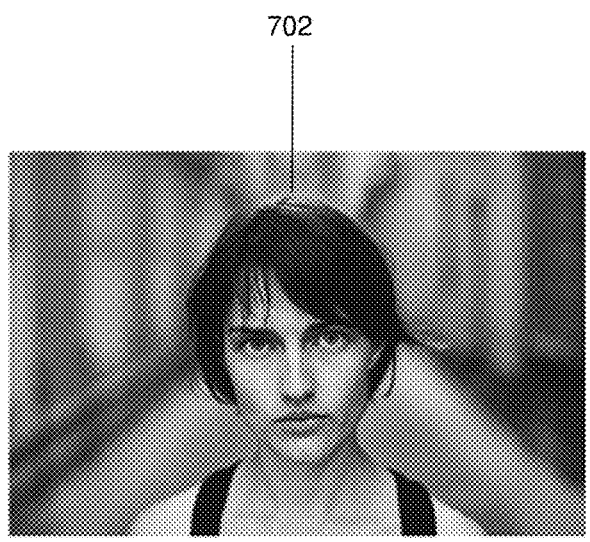
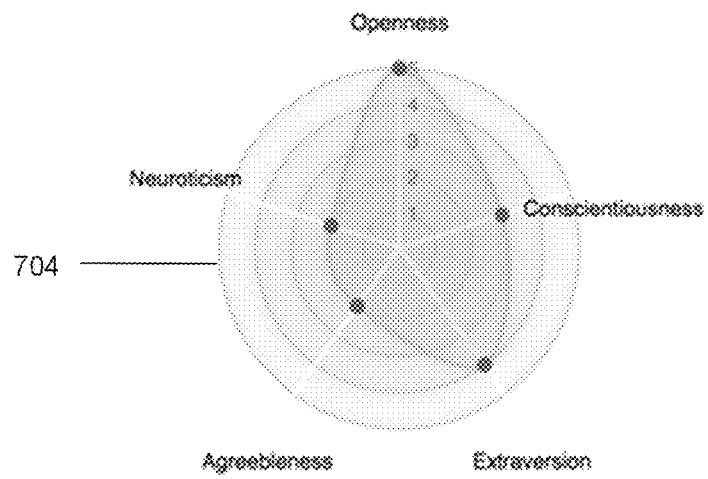
FIG. 7

PERSONA-DRIVEN AND ARTIFICIALLY-INTELLIGENT AVATAR

CROSS-REFERENCE TO RELATED APPLICATIONS

The present application is a continuation of U.S. patent application Ser. No. 16/235,601, filed Dec. 28, 2018, now U.S. Pat. No. 11,301,746, the contents of which are hereby incorporated by reference in their entirety. U.S. patent application Ser. No. 16/235,601 claims priority to and the benefit of U.S. Provisional Pat. Application No. 62/612,383, filed Dec. 30, 2017.

FIELD OF THE INVENTION

The present application relates to avatar technologies, artificial intelligence technologies, machine learning technologies, virtual assistant technologies, and computing technologies, and more particularly, to a persona-driven and artificially-intelligent avatar.

BACKGROUND

In today's technologically-driven society, various systems and methods exist for assisting users with performing various tasks, performing actions, learning about a product or service, or a combination thereof. For example, a particular business may have an online website that includes a live chat feature that may enable a user to converse with a live agent working for the business in order to learn more about the products and services that the business provides. As another example, certain businesses utilize specialized digital media content including information and tutorials that illustrate the various functional features of a product or service and how to use the product or service. As yet a further example, there exist various commercially available virtual assistants, which can understand simple human natural language input, communicate with users, or perform certain operations in response to a user's request. Conventional virtual assistants, such as those utilized on smartphones or other mobile devices, may allow a user to interact with the virtual assistant through voice inputs, and then respond to the user through a voice interface. Other virtual assistants require a user's input to understand or simulate what a user is feeling or what the user desires.

Even though existing technologies do provide various levels of assistance to users, such technologies often do not provide enough relevant information to a user or are difficult for the user to interact with. Additionally, current virtual assistant technologies and processes are often error-prone, are typically user-centric, provide a lot of irrelevant information, and perform actions that are required to be defined by a user's commands or interactions with a virtual assistant. Moreover, currently existing technologies have not provided the optimal means for providing assistance to users and are not particularly adept at assisting users with technologies, products, or services that are complicated or complex for the typical layperson to understand. In particular, products and services that incorporate machine learning and artificial intelligence technologies are often difficult for users to understand. For example, in the investment realm, an investor may not understand all the investment technical jargon embedded in and utilized by a virtual assistant, such as a robo-advisor or trader that incorporates such technologies. Additionally, such robo-advisors or traders and their corresponding artificial intelligence algorithms are often touted based on some performance metric, such as expected monetary gains or losses. Moreover, currently existing virtual assistants are incapable of self-learning and adapting to changing conditions. As a result, current technologies and processes may be modified and improved so as to provide enhanced functionality and features for users. Such enhancements and improvements may provide for improved quality of service for users, improved interactions with users, improved user satisfaction, increased efficiencies, increased access to meaningful data, substantially-improved decision-making abilities, and increased ease-of-use for users.

SUMMARY

A system and accompanying methods for providing a persona-driven and artificially-intelligent avatar and associated virtual assistant that performs actions on behalf of a user or device are disclosed. In particular, the system and accompanying methods provide a collection of digital avatars, each of which is imbued with a persona to reflect the complex functionality of an artificially-intelligent virtual assistant, which may be referred to herein as an "AIVA", that performs actions on behalf of a user or device. In doing so, the system and methods enable a user or device to infer from the persona of the digital avatar the functionality, capabilities, strategies, behavior, and operation of the AIVA represented by the digital avatar. In certain embodiments, the persona of the digital avatar may have quantifiable traits, parameters, and/or characteristics that may be utilized to influence the observation, learning, reasoning, and behavior of an AIVA the digital avatar is associated with. For each persona, a corresponding AIVA may be created to specifically match with the parameters, characteristics, and traits of the persona of a digital avatar. In other words, for each AIVA, a persona and corresponding digital avatar may be created to represent the AIVA.

Notably, the persona-driven and artificially-intelligent avatar and associated virtual assistant may be utilized in a variety of contexts. For example, the persona-driven and artificially intelligent avatar and associated virtual assistant may be utilized in the investment context. In view of the investment context, there is a segment of investors that are not being served well today by currently existing technologies. This segment of investors are those that have some funds to invest, but not enough to hire a dedicated investment advisor who would discuss their investments and investment strategies with them. Usually, when investors first engage an investment firm to manage their investments, they are asked to complete a risk tolerance questionnaire, and, based on the investor's age and risk tolerance score calculated from the questionnaire answers, the investor is categorized into an investment group and a basket of investment assets associated with this group is purchased for the investor's account. This approach often leaves the investor baffled, especially during a market down cycle when the investor's investment decreases. Most investors do not have the time nor the patience to understand the modern portfolio theory behind the portfolio of asset selection that the investment firm chose for the investor. The persona-driven and artificially-intelligent avatar and associated virtual assistant may serve this type of investor by providing him or her with more tailored attention, but without the need for hiring an expensive human investment advisor.

In certain embodiments, the artificially-intelligent avatar and associated virtual assistant may be persona-driven without human interaction and may not require simulation of the personality of the user using the services of the avatar and the associated virtual assistant. Additionally, the persona-driven and artificially-intelligent avatar and associated virtual assistant may have self-learning capabilities, which may be utilized to improve the performance of the avatar and virtual assistant over time. In certain embodiments, the artificially-intelligent avatar and associated virtual assistant may be configured to learn from other avatars and virtual assistants and the performance of other avatars and virtual assistants. In doing so, the performance of the avatars and virtual assistants may be improved in rapid fashion. In certain embodiments, a plurality of avatars may be rendered or otherwise made available to users or devices for selection. For example, a user may select one or more of the digital avatars to perform investment decisions on behalf of the user, which have personas having characteristics that the user finds desirable. The characteristics of the personas and avatars may include, but are not limited to, personality, background experience, appearance, age, virtual physical condition, any other characteristic, or a combination thereof. While the user may not understand all of the technical features embedded within a virtual assistant represented by the digital avatar, the persona of the digital avatar may convey the types of strategies and operational style of the virtual assistant so that the user has a better understanding or is at least comfortable with proceeding. As a result, the persona itself may be marketed or sold to the user instead of the complex and hard-to-understand artificial-intelligence algorithms supporting the functionality of the virtual assistant. Notably, the persona itself may match and directly influence the artificial intelligence algorithms underpinning the virtual assistant and/or digital avatars.

In certain embodiments, a user or device of the system may assemble a team of digital avatars and corresponding virtual assistants as a way to diversify the actions performed in their behalf. For example, in the investment context, the team of digital avatars and corresponding virtual assistants may diversify a user's investments, which may be utilized to reduce investment risk and volatility. In certain embodiments, a user or device may adopt a fund of funds style of investment by selecting a managing digital avatar and corresponding virtual assistant to manage the allocation of funds to each of the digital avatars and corresponding virtual assistants under its control. For example, in the investment context, the managing digital avatar and corresponding virtual assistant may accomplish this by assessing the risk and reward of each possible trade to be performed by the digital avatars and virtual assistants under its control and the likelihood of a trade being profitable over a period of time.

In essence, the system and methods may be utilized to combine a humanistic persona with complex artificial intelligence algorithms as a way to gain user confidence with technology that most people do not understand. In a novel way, the quantifiable features of the persona of the digital avatar may be utilized to range bound the controlling parameters of the virtual assistant to which it is associated with. In certain embodiments, the digital avatars and corresponding virtual assistants possess self-learning capabilities, including learning from its own actions and from other digital avatars and virtual assistants. As a result, the controlling parameters and the quantifiable features of the persona of the digital avatar do not need to be fixed in a constant state, but, instead, can shift within a range. The digital avatars and virtual assistants can observe, learn, reason, and behave, and do not have to be user-centric, but, instead, may be selected by a user or device. Based on the functionality provided by the system and methods, the system and methods can provide enhanced functionality and features for users and devices. Such enhancements and features may provide for improved quality of service for users, improved interactions with users, improved user satisfaction, increased efficiencies, increased access to meaningful data, substantially-improved decision-making abilities, and increased ease-of-use for users.

To that end, in one embodiment according to the present disclosure, a system for providing a persona-driven and artificially-intelligent avatar and associated virtual assistant that performs actions on behalf of a user or device is disclosed. The system may include a memory that stores instructions and a processor that executes the instructions to perform operations conducted by the system. The system may perform an operation that includes providing an AIVA for performing actions associated with at least one investment strategy of a plurality of investment strategies for a user. The actions and functionality of the AIVA may be facilitated by an observation, learning, and reasoning module (OLRM), which may be a software program including one or more artificial intelligence algorithms and functions to facilitate the operations and actions of the AIVA. The system may proceed to perform an operation that includes generating a digital avatar for representing the AIVA. In certain embodiments, the digital avatar may have a persona including characteristics that set ranges for parameters for controlling the actions of the AIVA that are facilitated by the OLRM. The system may proceed to perform an operation that includes receiving a selection by a computing device associated with the user to select the AIVA represented by the digital avatar to perform the actions on behalf of the user. Once the AIVA represented by the avatar is selected, the system may perform an operation that includes performing, by utilizing the first AIVA, the actions associated with the investment strategy on behalf of the user. After the actions are performed, the system may perform an operation that includes determining a metric corresponding to a performance of the AIVA represented by the digital avatar. The system may then proceed to perform an operation that includes modifying, based on the metric corresponding to the performance of the AIVA, the parameters of the OLRM so as to adjust future actions performed by the AIVA on behalf of the user.

In another embodiment, a method for providing a persona-driven and artificially-intelligent avatar and associated virtual assistant that performs actions on behalf of a user or device is disclosed. The method may include utilizing a memory that stores instructions, and a processor that executes the instructions to perform the various functions of the method. In particular, the method may include generating an AIVA for performing actions associated with at least one investment strategy of a plurality of investment strategies for a user. In certain embodiments, the actions and functionality of the AIVA may be facilitated by an OLRM. Additionally, the method may include providing a digital avatar for representing the AIVA. The digital avatar may have a persona including characteristics that set ranges for parameters for controlling the actions performed by the AIVA that are facilitated by the OLRM. Furthermore, the method may include receiving a selection by a computing device associated with the user to select the AIVA represented by the digital avatar to perform the actions on behalf of the user. The method may then include performing, by utilizing the AIVA represented by the digital avatar, the actions associated with the investment strategy on behalf of the user. Moreover, the method may include determining, after the actions are performed, a metric corresponding to a performance of the first AIVA represented by the first digital avatar.

According to yet another embodiment, a computer-readable device having instructions for providing a persona-driven and artificially-intelligent avatar and associated virtual assistant that performs actions on behalf of a user or device is provided. The computer instructions, which when loaded and executed by a processor, may cause the processor to perform operations including: providing an AIVA for performing actions associated with at least one investment strategy of a plurality of investment strategies for a user, wherein the actions and functionality of the AIVA are facilitated by an OLRM; generating a digital avatar for representing the AIVA, wherein the digital avatar has a persona including characteristics that set ranges for parameters for controlling the actions facilitated by the OLRM; performing, by utilizing the AIVA represented by the digital avatar, the actions associated with the investment strategy on behalf of the user; and determining, after the actions are performed, a metric corresponding to a performance of the AIVA represented by the digital avatar.

In one aspect, a system comprises a memory that stores instructions; and a processor that executes the instructions to perform operations, the operations comprising: receiving, by a computing device from a user, a selection of an AIVA among a plurality of AIVAs to perform actions on behalf of the user, facilitating, with an OLRM, actions and functionality of the AIVA, wherein the AIVA is associated with at least one personal shopper of a plurality of personal shoppers for a user and is represented by a digital avatar having a persona that includes characteristics that set ranges for parameters for controlling the actions of the AIVA facilitated by the OLRM, and wherein the plurality of AIVAs perform different actions based on the persona of the corresponding digital avatar and the parameters of the corresponding OLRM, performing, by utilizing the AIVA represented by the digital avatar, the actions associated with the personal shopper on behalf of the user, determining, after the actions are performed, a metric corresponding to a performance of the AIVA represented by the digital avatar, and modifying, based on the metric corresponding to the performance of the AIVA, parameters of the OLRM so as to adjust future actions performed by the AIVA on behalf of the user, wherein modifying the parameters of the OLRM comprises modifying parameters associated with: selecting a data source for obtaining information for implementing a modified version of the first investment strategy.

In another aspect, a method comprises generating, by utilizing instructions from a memory that are executed by a processor, a plurality of AIVAs, each for performing actions associated with at least one personal shopper of a plurality of personal shoppers for a user, wherein the actions and functionality are facilitated by an OLRM, wherein each AIVA is represented by a digital avatar having a persona that includes characteristics that set ranges for parameters for controlling the actions of the AIVA facilitated by the OLRM, and wherein the plurality of AIVAs perform different actions based on the persona of the corresponding digital avatar and the parameters of the corresponding OLRM; presenting to the user, with a computing device, a plurality of AIVAs; receiving, with the computing device, a selection from a user of an AIVA represented by a digital avatar to perform actions on behalf of the user; performing, by utilizing the AIVA represented by the digital avatar, the actions associated with the personal shopper on behalf of the user; and determining, after the actions are performed, a metric corresponding to a performance of the AIVA represented by the digital avatar, wherein the parameters of the OLRM are modified, wherein modifying the parameters comprises modifying parameters associated with selecting a data source for obtaining information for implementing a modified version of the first investment strategy and adjusting a weight associated with selecting a model utilized by the first OLRM.

These and other features of the systems and methods for providing a persona-driven and artificially-intelligent avatar and associated virtual assistant that performs actions on behalf of a user or device are described in the following detailed description, drawings, and appended claims.

BRIEF DESCRIPTION OF THE DRAWINGS

FIG. 3 is a table illustrating various characteristics that may be associated with personas of avatars utilized with the system of FIG. 1.

FIG. 5 is a first sample avatar for use with the system of FIG. 1, which illustrates various traits and characteristics associated with the persona of the first sample avatar.

FIG. 6 is a second sample avatar for use with the system of FIG. 1, which illustrates various traits and characteristics associated with the persona of the second sample avatar.

FIG. 7 is a third sample avatar for use with the system of FIG. 1, which illustrates various traits and characteristics associated with the persona of the third sample avatar.

DETAILED DESCRIPTION OF THE INVENTION

Figure 1:
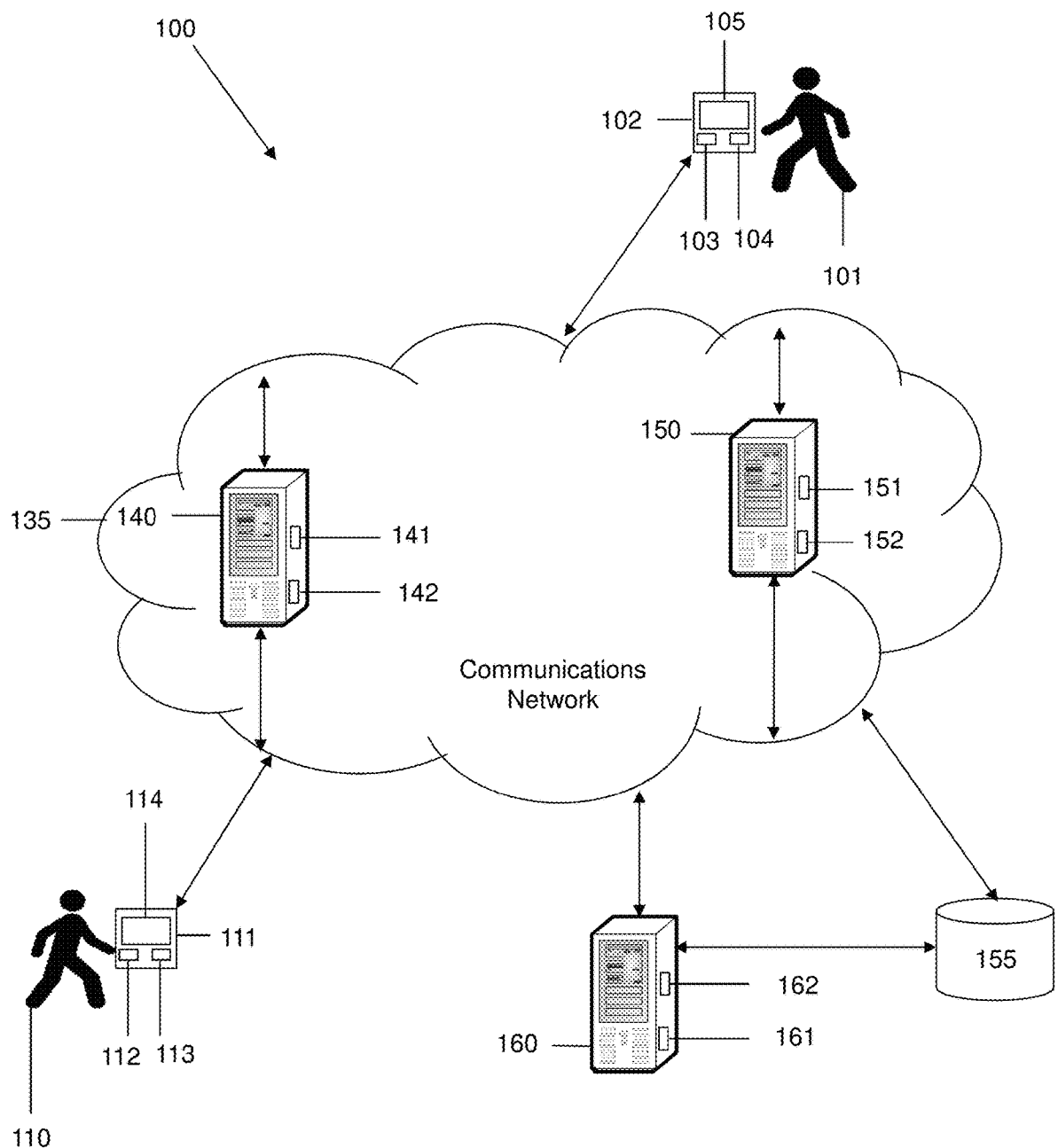
FIG. 1 is a schematic diagram of a system for providing a persona-driven and artificially-intelligent avatar and associated virtual assistant that performs actions on behalf of a user or device according to an embodiment of the present disclosure.

A system 100 and methods for providing a persona-driven and artificially-intelligent avatar 202a-z and associated virtual assistant that performs actions on behalf of a user or device are disclosed. In particular, the system 100 and accompanying methods provide a collection of digital avatars 202a-z, each of which is imbued with a persona to reflect the complex functionality of an artificially-intelligent virtual assistant ("AIVA") that performs actions on behalf of a user or device. In doing so, the system 100 and methods enable a user or device to infer from the persona of the digital avatar 202a-z the functionality, capabilities, strategies, behavior, and operation of the AIVA represented by the digital avatar 202a-z. In certain embodiments, the persona of the digital avatar 202a-z may have quantifiable traits, parameters, and/or characteristics that may be utilized to influence the observation, learning, reasoning, and behavior of an AIVA the digital avatar 202a-z is associated with. For each persona, a corresponding AIVA may be created to specifically match with the parameters, characteristics, and traits of the persona of a digital avatar 202a-z. In other words, for each AIVA, a persona and corresponding digital avatar 202a-z may be created to represent the AIVA.

In certain embodiments, the system 100 and methods may be utilized to combine a humanistic persona with complex artificial intelligence algorithms as a way to gain user confidence with technology that people may not understand. In a novel way, the quantifiable features of the persona of the digital avatar 202a-z may be utilized to range bound the controlling parameters of the AIVA to which it is associated with. In certain embodiments, the digital avatars 202-a-z and corresponding virtual assistants may possess self-learning capabilities, including learning from its own actions and from other digital avatars and virtual assistants. As a result, the controlling parameters and the quantifiable features of the persona of the digital avatar 202a-z do not need to be fixed in a constant state, but, instead, can shift within a range that may be mapped to the characteristics of the persona itself. The digital avatars 202a-z and virtual assistants can observe, learn, reason, and behave, and do not have to be user-centric, but, instead, may be selected by a user or device to assist them. Based on the functionality provided by the system 100 and methods, the system 100 and methods provide enhanced functionality and features for users and/or devices. Such enhancements and features may provide for improved quality of service for users, improved interactions with users, improved user satisfaction, increased efficiencies, increased access to meaningful data, substantially-improved decision-making abilities, and increased ease-of-use for users.

As shown in FIGS. 1-9, a system 100 and method 800 for providing a persona-driven and artificially-intelligent avatar and associated virtual assistant that performs actions on behalf of a user or device is disclosed. The system 100 may be configured to support, but is not limited to supporting, artificial intelligence and machine learning services, data and content services, computing applications and services, cloud computing services, internet services, satellite services, telephone services, software as a service (SaaS) applications, mobile applications and services, and any other computing applications and services. The system may include a first user 101, who may utilize a first user device 102 to access data, content, and applications, or to perform a variety of other tasks and functions. As an example, the first user 101 may utilize first user device 102 to access an application (e.g. a browser or a mobile application) executing on the first user device 102 that may be utilized to access web pages, data, and content associated with the system 100. In certain embodiments, the first user 101 may be any type of user that may potentially desire to seek information and/or assistance with something of interest to the user. For example, the user may seek information about a product or service, assistance with using a product or service, assistance with implementing one or more investment strategies, assistance with ordering products, assistance with playing a video game, tutoring assistance, management consulting services, a social network companion for assisting the user with social network features, assistance with driving a vehicle, any type of assistance or information, or any combination thereof. For example, the first user 101 may be an individual that is seeking a virtual assistant to assist him or her by providing possible options for investment strategies that the virtual assistant could implement on behalf of the user.

The first user device 102 utilized by the first user 101 may include a memory 103 that includes instructions, and a processor 104 that executes the instructions from the memory 103 to perform the various operations that are performed by the first user device 102. In certain embodiments, the processor 104 may be hardware, software, or a combination thereof. The first user device 102 may also include an interface 105 (e.g. screen, monitor, graphical user interface, etc.) that may enable the first user 101 to interact with various applications executing on the first user device 102, to interact with various applications executing within the system 100, and to interact with the system 100 itself. In certain embodiments, the first user device 102 may be a computer, a laptop, a tablet device, a phablet, a server, a mobile device, a smartphone, a smart watch, a robot, and/or any other type of computing device. Illustratively, the first user device 102 is shown as a mobile device in FIG. 1. The first user device 102 may also include a global positioning system (GPS), which may include a GPS receiver and any other necessary components for enabling GPS functionality, accelerometers, gyroscopes, sensors, and any other componentry suitable for a mobile device.

In addition to the first user 101, the system 100 may include a second user 110, who may utilize a second user device 111 to access data, content, and applications, or to perform a variety of other tasks and functions. As with the first user 101, the second user 110 may be any type of user that may potentially desire to seek information and/or assistance with something of interest to the user. Much like the first user 101, the second user 110 may utilize second user device 111 to access an application (e.g. a browser or a mobile application) executing on the second user device 111 that may be utilized to access web pages, data, and content associated with the system 100. The second user device 111 may include a memory 112 that includes instructions, and a processor 113 that executes the instructions from the memory 112 to perform the various operations that are performed by the second user device 111. In certain embodiments, the processor 113 may be hardware, software, or a combination thereof. The second user device 111 may also include an interface 114 (e.g. a screen, a monitor, a graphical user interface, etc.) that may enable the second user 110 to interact with various applications executing on the second user device 111, to interact with various applications executing in the system 100, and to interact with the system 100. In certain embodiments, the second user device 111 may be a computer, a laptop, a tablet device, a phablet, a server, a mobile device, a smartphone, a smart watch, a robot, and/or any other type of computing device. Illustratively, the second user device 111 may be a computing device in FIG. 1. The second user device 111 may also include any of the componentry described for first user device 102.

In certain embodiments, the first user device 102 and the second user device 111 may have any number of software applications and/or application services stored and/or accessible thereon. For example, the first and second user devices 102, 111 may include artificial intelligence-based applications, machine learning-based applications, applications for facilitating the completion of tasks, cloud-based applications, search engine applications, natural language processing applications, database applications, algorithmic applications, phone-based applications, product-ordering applications, business applications, investment applications, e-commerce applications, media streaming applications, content-based applications, database applications, gaming applications, internet-based applications, browser applications, mobile applications, service-based applications, productivity applications, video applications, music applications, social media applications, presentation applications, any other type of applications, any types of application services, or a combination thereof. In certain embodiments, the software applications and services may include one or more graphical user interfaces so as to enable the first and second users 101, 110 to readily interact with the software applications. The software applications and services may also be utilized by the first and second users 101, 110 to interact with any device in the system 100, any network in the system 100, or any combination thereof. For example, the software applications executing on the first and second user devices 102, 111 may be applications for receiving data, applications for storing data, applications for receiving demographic and preference information, applications for transforming data, applications for executing mathematical algorithms, applications for generating and transmitting electronic messages, applications for generating and transmitting various types of content, any other type of applications, or a combination thereof. In certain embodiments, the first and second user devices 102, 111 may include associated telephone numbers, internet protocol addresses, device identities, or any other identifiers to uniquely identify the first and second user devices 102, 111 and/or the first and second users 101, 110. In certain embodiments, location information corresponding to the first and second user devices 102, 111 may be obtained based on the internet protocol addresses, by receiving a signal from the first and second user devices 102, 111, or based on profile information corresponding to the first and second user devices 102, 111.

The system 100 may also include a communications network 135. The communications network 135 of the system 100 may be configured to link each of the devices in the system 100 to one another. For example, the communications network 135 may be utilized by the first user device 102 to connect with other devices within or outside communications network 135. Additionally, the communications network 135 may be configured to transmit, generate, and receive any information and data traversing the system 100. In certain embodiments, the communications network 135 may include any number of servers, databases, or other componentry, and may be controlled by a service provider. The communications network 135 may also include and be connected to a cloud-computing network, a phone network, a wireless network, an Ethernet network, a satellite network, a broadband network, a cellular network, a private network, a cable network, the Internet, an internet protocol network, a content distribution network, any network, or any combination thereof. Illustratively, server 140 and server 150 are shown as being included within communications network 135.

Notably, the functionality of the system 100 may be supported and executed by using any combination of the servers 140, 150, and 160. The servers 140, and 150 may reside in communications network 135, however, in certain embodiments, the servers 140, 150 may reside outside communications network 135. The servers 140, and 150 may be utilized to perform the various operations and functions provided by the system 100, such as those requested by applications executing on the first and second user devices 102, 111. In certain embodiments, the server 140 may include a memory 141 that includes instructions, and a processor 142 that executes the instructions from the memory 141 to perform various operations that are performed by the server 140. The processor 142 may be hardware, software, or a combination thereof. Similarly, the server 150 may include a memory 151 that includes instructions, and a processor 152 that executes the instructions from the memory 151 to perform the various operations that are performed by the server 150. In certain embodiments, the servers 140, 150, and 160 may be network servers, routers, gateways, switches, media distribution hubs, signal transfer points, service control points, service switching points, firewalls, routers, edge devices, nodes, computers, mobile devices, or any other suitable computing device, or any combination thereof. In certain embodiments, the servers 140, 150 may be communicatively linked to the communications network 135, any network, any device in the system 100, or any combination thereof.

The database 155 of the system 100 may be utilized to store and relay information that traverses the system 100, cache information and/or content that traverses the system 100, store data about each of the devices in the system 100, and perform any other typical functions of a database. In certain embodiments, the database 155 may store the output from any operation performed by the system 100, operations performed and output generated by the first and second user devices 102, 111, the servers 140, 150, 160 or any combination thereof. In certain embodiments, the database 155 may store a record of any and all information obtained from any data sources utilized by the system 100 to facilitate the operative functions of the system 100 and its components, a record of actions taken by a virtual assistant, a record of performance metrics associated with the performance of the virtual assistant as it relates to the actions taken by the virtual assistant, a record of parameters by which the OLRMs 204$a$-$z$ operate by, a record including information pertaining to behaviors tracked by behavior modules 206$a$-$b$ of the virtual assistants and avatars 202$a$-$z$, a record including characteristics and features of each avatar 202$a$-$z$, a record including characteristics and features of each virtual assistant, a record including characteristics and features of each OLRM 204$a$-$z$, a record identifying which parameters of the OLRMs 204$a$-$z$ have been modified and how the parameters have been modified, a record identifying actions performed by users, a record identifying interactions between the users and the avatars 202$a$-$z$ and/or virtual assistants 204$a$-$z$, any other data traversing the system 100, or any combination thereof. In certain embodiments, the database 155 may be connected to or reside within the communications network 135, any other network, or a combination thereof. In certain embodiments, the database 155 may serve as a central repository for any information associated with any of the devices and information associated with the system 100. Furthermore, the database 155 may include a processor and memory or be connected to a processor and memory to perform the various operations associated with the database 155. In certain embodiments, the database 155 may be connected to the servers 140, 150, 160, the first user device 102, the second user device 111, any devices in the system 100, any other device, any network, or any combination thereof.

The database 155 may also store information obtained from the system 100, store information associated with the first and second users 101, 110, store location information for the first and second user devices 102, 111 and/or first and second users 101, 110, store user profiles associated with the first and second users 101, 110, store device profiles associated with any device in the system 100, store communications traversing the system 100, store user preferences, store demographic information for the first and second users 101, 110, store information associated with any device or signal in the system 100, store information relating to usage of applications accessed by the first and second user devices 102, 111, store any information obtained from any of the networks in the system 100, store historical data associated with the first and second users 101, 110, store device characteristics, store information relating to any devices associated with the first and second users 101, 110, or any combination thereof. The user profiles may include any type of information associated with an individual (e.g. first user 101 and/or second user 110), such as, but not limited to, investment preferences, preferences relating to the type of virtual assistant and/or avatar 202*a-z* preferred by the user, contact information, demographic information, psychographic information, work history information, education information, any attributes of the individual, any other information, or a combination thereof. Device profiles may include any type of information associated with a device, such as, but not limited to, operating system information, hardware specifications, information about each component of the device (e.g. sensors, processors, memories, batteries, etc.), attributes of the device, any other information, or a combination thereof.

In certain embodiments, the database 155 may store algorithms facilitating the operation of the avatars 202*a-z*, virtual assistants, and/or OLRMs 204*a-z*, algorithms for determining the performance metrics associated with the virtual assistants and/or avatars 202*a-z*, artificial intelligence algorithms, machine learning algorithms, algorithms for recommending and implementing investment strategies, algorithms for facilitating online shopping, algorithms for facilitating online education, algorithms for facilitating video game play and objectives, algorithms for facilitating the operation of a vehicle, algorithms for facilitating management consulting services, algorithms for facilitating social network interactions and functionality, algorithms for performing any operations and/or calculations performed by the system 100, any type of algorithm, or any combination thereof. In certain embodiments, the database 155 may be configured to store any information generated and/or processed by the system 100, store any of the information disclosed for any of the operations and functions disclosed for the system 100 herewith, store any information traversing the system 100, or any combination thereof. Furthermore, the database 155 may be configured to process queries sent to it by any device in the system 100.

The system 100 may also include a software application or program, which may be configured to perform and support the operative functions of the system 100. In certain embodiments, the application may be a software program, a website, a mobile application, a software application, a software process, or a combination thereof, which may be made accessible to users utilizing one or more computing devices, such as first user device 102 and second user device 111. The application of the system 100 may be accessible via an internet connection established with a browser program executing on the first or second user devices 102, 111, a mobile application executing on the first or second user devices 102, 111, or through other suitable means. Additionally, the application may allow users and computing devices to create accounts with the application and sign-in to the created accounts with authenticating username and password log-in combinations. The application may include a custom graphical user interface that the first user 101 or second user 110 may interact with by utilizing a web browser executing on the first user device 102 or second user device 111. In certain embodiments, the software application may execute directly as an installed program on the first and/or second user devices 102, 111, such as a mobile application or a desktop application.

The software application may include multiple programs and/or functions that execute within the software application and/or are accessible by the software application. For example, the software application may include an application that generates web content and pages that may be accessible to the first and/or second user devices 102, 111, any type of program, or any combination thereof. The application that generates web content and pages may be configured to generate a graphical user interface for the software application that is accessible and viewable by the first and second users 101, 110 when the software application is loaded and executed on the first and/or second computing devices 102, 111. The graphical user interface for the software application may display content for viewing by the first and/or second users 101, 110 via the first and/or second user devices 102, 111. Additionally, the graphical user interface may display functionality provided by the software application that enables the second user 110 and/or the second computing device 111 to interact with the software application and the modules supporting the software application's functionality.

Figure 2:
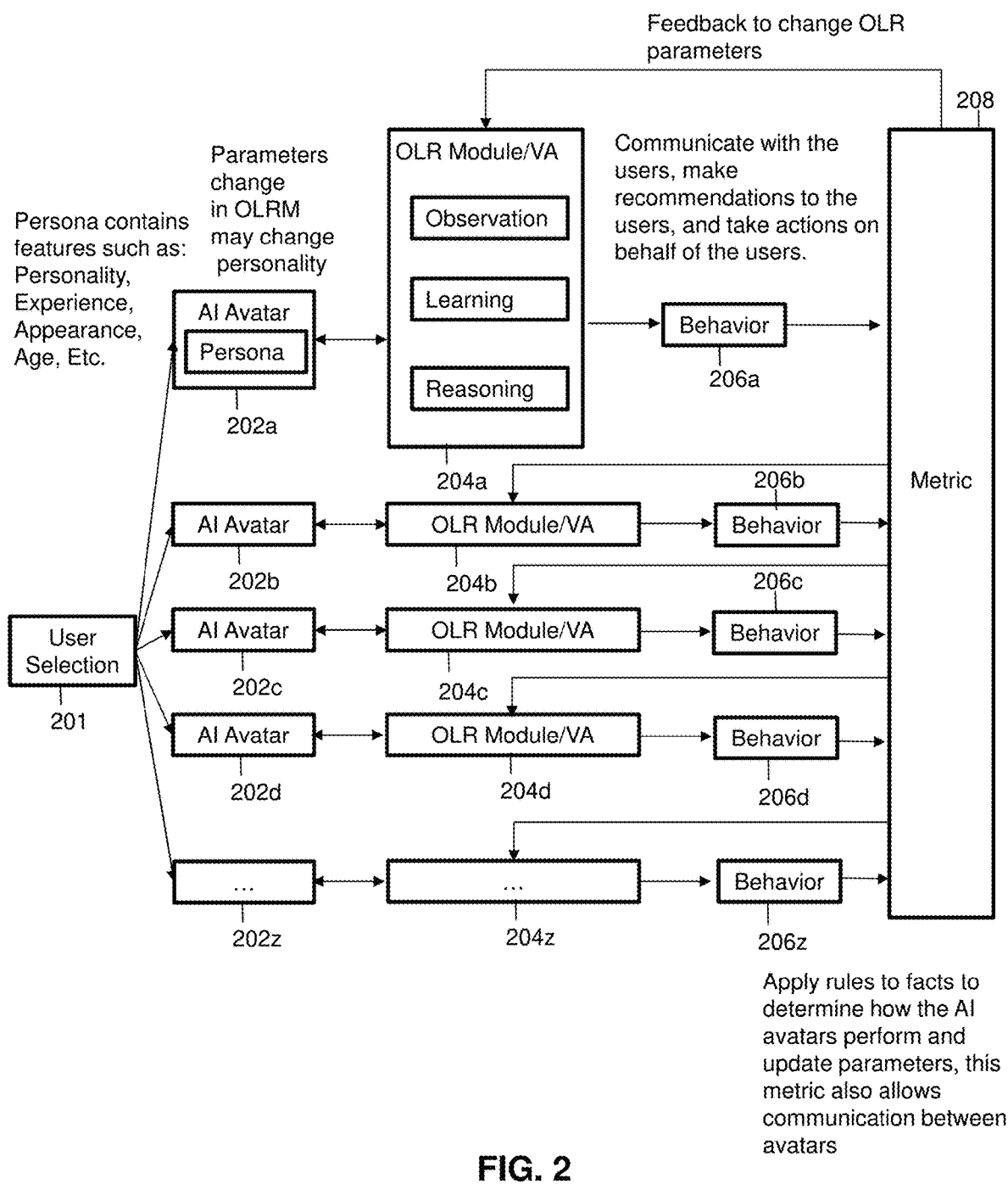
FIG. 2 is a schematic diagram illustrating various features, functionality, and components of the system of FIG. 1 including avatars and OLRMs corresponding to virtual assistants, which facilitate the tracking of behavior, performing metric analysis, and updating parameters of the OLRMs.

In certain embodiments and referring now also to FIG. 2, the software application may include one or more digital avatars 202*a-z* that may be provided as a selection 201 to a user or device. The digital avatars 202*a-z* may be programs or functions of the software application that may be visually rendered or otherwise presented (e.g. such as by audio or other means) to a user or device via the software application to represent one or more AIVAs. In certain embodiments, the digital avatars 202*a-z* may appear like a movie character, a video game character, a rendered human character, an animal, or as anything. The digital avatars 202*a-z* may have personas programmed for them that have features, characteristics and/or parameters including, but are not limited to, personality, background experience (e.g. programmed educational experience or learned experience from use of the avatars 202*a-z*), appearance, age, virtual physical condition, digital clothing/fashion style, virtual physical mannerisms, behaviors, any other characteristic, or a combination thereof. In certain embodiments, the persona of the digital avatars 202*a-z* may conform to one or more personality models consisting of one or more dimensions, where each dimension may be a specific property of the persona. For example, the 5-dimension Openness, Conscientiousness, Extraversion, Agreeableness, and Neuroticism (OCEAN) model may be utilized for the personas of the digital avatars 202*a-z*, the 16*pf* model with 16 dimensions may be utilized, or any other model may be utilized. For the OCEAN model, the dimensions of the persona may be on a scale from 1-5 (or any other suitable scale), where 1 is the lowest level for exhibiting the particular characteristic and 5 is the highest level for exhibiting the particular characteristic. In certain embodiments, each of the digital avatars 202*a-z* may have their own persona, however, in certain embodiments, groups of avatars 202*a-z* may share a persona and/or have an overlap in persona. The features, characteristics, and/or parameters of the personas of the digital avatars 202*a-z* may be utilized to decide the range of the controlling parameters of AIVAs, which may be programs and/or functions implemented by one or more OLRMs 204*a-z*, to perform one or more actions on behalf of a user or device. In certain embodiments, the features, characteristics, and/or parameters of the personas of the digital avatars 202a-z may be mapped to the parameters of the AIVAs implemented by the one or more OLRMs 204a-z by utilizing a mapping function of the system 100.

The OLRMs 204a-z may be software modules that have a variety of parameters controlling them, and may be configured to perform actions on behalf of a user (e.g. first or second users 101, 110) or a device (e.g. first and second user devices 102, 111). For example, the parameters may be parameters associated with selecting certain types of data sources for obtaining information for implementing an actionable strategy and weighting the types of data sources, parameters associated with selecting models and weights for the models (e.g. models that enable OLRMs 204a-z to determine patterns, anomalies, relationships, and correlations between datasets accessible by the OLRMS 204a-z), parameters relating to a training frequency for the models utilized by the OLRMs 204a-z, parameters associated with a training dataset size for training the models, parameters associated with utilizing hyper-parameters in the models, parameters associated with classes of investment options to be utilized by the OLRMs 204a-z, parameters that may dictate actions performed by the OLRMs 204a-z, any other parameters relating to the operation of the OLRMs 204a-z, or any combination thereof. The parameters of the OLRMs 204a-z may be influenced and/or controlled by the characteristics of the personas of the digital avatars 202a-z, and/or vice versa.

The OLRMs 204a-z may consist of observation modules and learning and reasoning modules. The virtual assistants, implemented via the OLRMs 204a-z, may monitor, such as by using the observation modules, various sources of data and types of data, retrieve the data, and save the data in a database 155 after pre-processing the data. For example, in an investment context, the OLRMs 204a-z may monitor certain data relating to market indicators (e.g. investment-related indicators), events, and social networks, and retrieve and store such data. In certain embodiments, the OLRMs 204a-z may acquire indicators such as, but not limited to, an investment instrument price, trading volume, macroeconomic indicators, microeconomic indicators, any type of indicators, or any combination thereof. In certain embodiments, the OLRMs 204a-z may monitor news and political policies, gather social media posts, comments, tags, and search engine keywords from various networks, such as, but not limited to, social media networks. The OLRMs 204a-z may pre-process all gathered and accessed data using methods including, but not limited to, long short-term memory (LSTM) networks, recurrent neural networks, artificial neural networks (ANNs), deep neural networks (DNNs), any type of neural network or other machine learning system, or any combination thereof. In certain embodiments, depending on the specific parameters, traits, and/or characteristics of the persona of a digital avatar 202a-z representing the AIVA, different information sources may be monitored by the OLRMs 204a-z and different pre-processing methods may be utilized. Once the OLRMs 204a-z process the data, the data may be imported into one or more databases, such as database 155, so that the OLRMs 204a-z may analyze the data to facilitate the performance of actions on behalf of a user or device.

The OLRMs 204a-z may also include one or more behavior modules 206a-z, which may be programs or functions that perform that actions of the virtual assistant represented by the digital avatars 202a-z. However, in certain embodiments, the behavior modules 206a-z may be separate from the OLRMs 204a-z. In certain embodiments, the actions performed by the behavior modules 206a-z may include, but are not limited to, conducting a trade, buying a product, communicating with other digital avatars 202a-z, monitoring and obtaining data from data sources, conducting analyses of the performance of the OLRMs 204a-z, any other action, etc. The behavior modules 206a-z may perform the actions based on the information obtained by the observation and learning and reasoning modules. Metrics 208 relating to the performance of the OLRMs 204a-z in performing the actions on behalf of a user or device may be obtained and analyzed by the behavior modules 206a-z, which may determine whether the actions conducted by the digital avatars 202a-z and/or OLRMs 204a-z were good, bad, or mediocre. The system 100 may apply rules to the facts relating to the performance of the OLRMs 204a-z to determine how the virtual assistants performed. The metrics 208 may be fed back, such as by utilizing the behavior modules 206a-z, to the OLRMs 204a-z corresponding to the digital avatars 202a-z. Based on the performance metrics 208, the parameters of the personas of the digital avatars 202a-z and/or OLRMs 204a-z may be modified so as to improve performance for future actions to be performed on behalf of the user and/or device utilizing the system 100. These concepts are discussed in further detail in method 800.

As indicated above, the parameters of the OLRMs 204a-z may be ranged bounded, influenced and/or controlled by the characteristics of the personas of the digital avatars 202a-z, and/or vice versa. Referring now also to FIG. 3 and in view of the OCEAN model described above, a low level of openness for the persona (e.g. value of 1-2) of a digital avatar 202a may dictate, in the investment context, that the OLRM 204a (virtual assistant) monitors fewer information sources, utilizes fewer financial instruments, utilizes fewer models when performing its operations, and tends to use traditional models when performing its operations on behalf of a user or device. In contrast, if the persona has a high level of openness (e.g. value of 4-5), the OLRM 204a may monitor and obtain data from a greater number of information sources, utilize a greater number of financial instruments, utilize more models, tend to use new models, and tend to self-improve its own functionality and behavior. With regard to the conscientiousness characteristic of the persona, a low level of conscientiousness may dictate that the OLRM 204a utilizes less complex models when performing operations and utilizing random factors to breaking rules utilized by the OLRM 204a. In contrast, for a high level of conscientiousness, this may dictate that the OLRM 204a may utilize complex models, strictly follow the models, and tend to trade at a higher frequency, particularly if at a higher information acquisition level. With regard to the extroversion characteristic of the persona, a low level of extroversion may dictate that the OLRM 204a may tend not to interact with other avatars 202b-z, has a low risk tolerance, utilize a relatively more complex observation module than other OLRMsb-z, and tend to trade with a long-term horizon. For a high level of extroversion for the persona, this may dictate that the OLRM 204a may tend to interact with other digital avatars 202b-z to obtain information, has a relatively high risk tolerance, and tend to trade with a short-term horizon.

With regard to the agreeableness characteristic of the persona of the digital avatar 202a, a low level of agreeableness may dictate that the OLRM 204a tends to be competitive with other digital avatars 202b-z (e.g. in terms of performance or obtaining the attention of the first or second user 101, 110), and tends not to trust other digital avatars 202*b-z*. In contrast, a high level of agreeableness may dictate that the OLRM 204*a* tends to follow herd behavior (e.g. such as following other digital avatars 202*b-z*), and tends to trust information sources from which data has been gathered. With regard to the neuroticism characteristic of the persona of the digital avatar 202*a*, a low level of neuroticism may dictate that the OLRM 204*a* tends to calculate risks before performing an action on behalf of a user or device, and tends to self-improve after a trading loss or other lack of performance. In contrast, a high level of neuroticism may dictate that the OLRM 204*a* utilizes a high random factor that leads to overtrading on behalf of the user or device.

Figure 4:
FIG. 4 is a table illustrating additional characteristics that may be associated with personas of avatars utilized with the system of FIG. 1.

Referring now also to FIG. 4, other characteristics of a persona of a digital avatar 202*a* and its control over the parameters of an OLRM 204*a* are shown. For example, for an educational background reflected by or programmed into the persona, a lower educational background may dictate that the OLRM 204*a* uses less complex models when performing actions, and a higher educational background may dictate that the OLRM 204*a* uses complex models. With regard to life experience reflected by, programmed into, or even learned by the persona, a lower life experience may dictate that the OLRM 204*a* utilizes fewer information sources and may overtrade on behalf of the a user or device. A higher life experience, in contrast, may dictate that the OLRM 204*a* uses a greater number of information resources and tends to calculate risks before performing an action. With regard to work experience of the persona, a lower level of work experience may dictate that the OLRM 204*a* uses fewer models and a higher level of work experience may dictate that the OLRM 204*a* uses a greater number of models when performing actions.

Operatively, the system 100 may operate accordingly the following exemplary investment strategy and personal shopper use-case scenario. Of course, the system 100 may be utilized for any other use-case scenario and the scenario described below is merely for illustration purposes. The first user 101 may be a user that seeks assistance from the system 100 in implementing one or more investment strategies on behalf of the first user 101 using the first user's 101 assets and with selecting an assistant for personal shopping for leather goods. To that end and referring also to FIGS. 5-7, the system 100 may render and visually display a plurality of digital avatars 502, 602, and 702 on the first user device 102 of the first user 101 for selection. In certain embodiments, the digital avatars 502, 602, and 702 may have the capabilities of digital avatars 202*a-z*. The digital avatar 502 may be rendered as a 70-year old woman, who is a math and economics PhD, a finance expert, and an independent socially-responsible investment trader. The digital avatar's 502 OCEAN value 504 may be 23432 for the persona of the digital avatar 502. Based on these values, the OLRM of the digital avatar 502 may utilize few indicators when implementing an investment strategy, may tend to use more conservative models for the investment strategy (e.g. moving average model or a momentum model), may tend to trade in only one market, may follow plans, may trade both long term and short term, may have a calm manner in dealing with losses after executing an investment strategy, and may observe the market for a long time before entering a trade and may utilize longer historical data.

The digital avatar 602 may be rendered as a 20-year old woman that is an adventurous investment trader, who loves outdoor adventurous activities, and may chase forex signals the same way she may hunt animals. The digital avatar's 602 OCEAN value 604 may be 53523 for the persona of the digital avatar 602. Based on these values, the OLRM of the digital avatar 602 may utilize more indicators than digital avatar 502, tend to try newer models (e.g. LSTM), tend to trade riskier assets with the goal of seeking higher returns (e.g. futures and options), adapt to signal price changes quickly, tend to trade short term (e.g. trading multiple times a day to get profits from a price fluctuation), and tend to enter a market quickly when there is a good signal (e.g. current market signal weights more than the historical price of an investment). Digital avatar 702 may be rendered as an avant-garde personal shopper that specializes in leather goods. The digital avatar 702 may be rendered as a woman who loves fashion, movies, art, and celebrity gossip, and imagines all her clients as superstars and her primary styling goal may be to attract attention for the first user 101. The digital avatar's 702 OCEAN value 704 may be 53422 for the persona of the digital avatar 702. Based on these values, the OLRM of the digital avatar 702 may tend to adapt to the latest fashion trends into the digital avatar's 702 styling methodology, utilize style based on constant innovation, take risks and be forward-thinking to break free from daily expectations, tend to interact with other digital avatars to get information and adjust styling methodology, tend to select artistry and unconventional designs for leather goods with unexpected cuts and oversized tailoring that separates the styles from mainstream styles, and has a personal mood that plays a major part in the styling selected by the digital avatar 702.

Based on the first user's 101 preferences, the first user 101 may select, via the first user device 102, the digital avatar 502 and the digital avatar 702 to implement an investment strategy and to assist with personal shopping for leather goods respectively. The digital avatar 502 and its corresponding virtual assistant implemented by an OLRM may proceed to perform actions on behalf of the first user 101 to implement an investment strategy. The persona of the digital avatar 502 may influence the actions performed by the virtual assistant on behalf of the first user 101. Metrics 208 relating to the performance of the virtual assistant may be monitored and analyzed, and may then be utilized to update the characteristics of the persona of the digital avatar 502 and/or the parameters of the OLRM supporting the virtual assistant associated with the digital avatar 502 so that future actions may be optimized for the first user 101. Similarly, the digital avatar 702 and its corresponding virtual assistant implemented by an OLRM may proceed to perform actions on behalf of the first user 101 to assist him or her with shopping for leather goods. Metrics 208 relating to the performance of the virtual assistant may be monitored and analyzed, and may then be utilized to update the characteristics of the persona of the digital avatar 702 and/or the parameters of the OLRM supporting the virtual assistant associated with the digital avatar 702 so that future actions may be optimized for the first user 101. In certain embodiments, the first user 101 may provide feedback to the system 100 that may be utilized to update the characteristics of the persona and/or parameters of the OLRM. For example, if the first user 101 thought that a leather dress selected by the virtual assistant was just average, the first user 101 may input feedback, which may be utilized to adjust the parameters of the OLRM of the digital avatar 702 and/or the persona of the digital avatar 702 to suit the first user's 101 preferences.

Notably, as shown in FIG. 1, the system 100 may perform any of the operative functions disclosed herein by utilizing the processing capabilities of server 160, the storage capacity of the database 155, or any other component of the system 100 to perform the operative functions disclosed herein. The server 160 may include one or more processors 162 that may be configured to process any of the various functions of the system 100. The processors 162 may be software, hardware, or a combination of hardware and software. Additionally, the server 160 may also include a memory 161, which stores instructions that the processors 162 may execute to perform various operations of the system 100. For example, the server 160 may assist in processing loads handled by the various devices in the system 100, such as, but not limited to, providing and/or generating AIVAs for performing actions on behalf of a user or device; generating avatars 202a-z that represent the virtual assistants; receiving selections from computing devices (e.g. first and second user devices 102, 111) to select virtual assistants represented by the avatars 202a-z; performing, by utilizing the virtual assistants, actions on behalf of a user or a device; determining metrics corresponding to the performance of the virtual assistant with regard to the actions performed; determining if the metrics indicate that parameters controlling the operations of the virtual assistants (OLRMs 204a-z) and/or avatars 202a-z need to be changed; modifying the parameters of the virtual assistants (OLRMs 204a-z); determining if the modified parameters fit a mapping range of a persona of a virtual assistant; modifying the personas; and performing any other suitable operations conducted in the system 100 or otherwise. In one embodiment, multiple servers 160 may be utilized to process the functions of the system 100. The server 160 and other devices in the system 100, may utilize the database 155 for storing data about the devices in the system 100 or any other information that is associated with the system 100. In one embodiment, multiple databases 155 may be utilized to store data in the system 100.

Although FIGS. 1-2 illustrates specific example configurations of the various components of the system 100, the system 100 may include any configuration of the components, which may include using a greater or lesser number of the components. For example, the system 100 is illustratively shown as including a first user device 102, a second user device 111, a communications network 135, a server 140, a server 150, a server 160, and a database 155. However, the system 100 may include multiple first user devices 102, multiple second user devices 111, multiple communications networks 135, multiple servers 140, multiple servers 150, multiple servers 160, multiple databases 155, or any number of any of the other components inside or outside the system 100. Similarly, the system 100 may include any number of avatars 202a-z, OLRMs 204a-z, and AIVAs. Furthermore, in certain embodiments, substantial portions of the functionality and operations of the system 100 may be performed by other networks and systems that may be connected to system 100.

Figure 8:
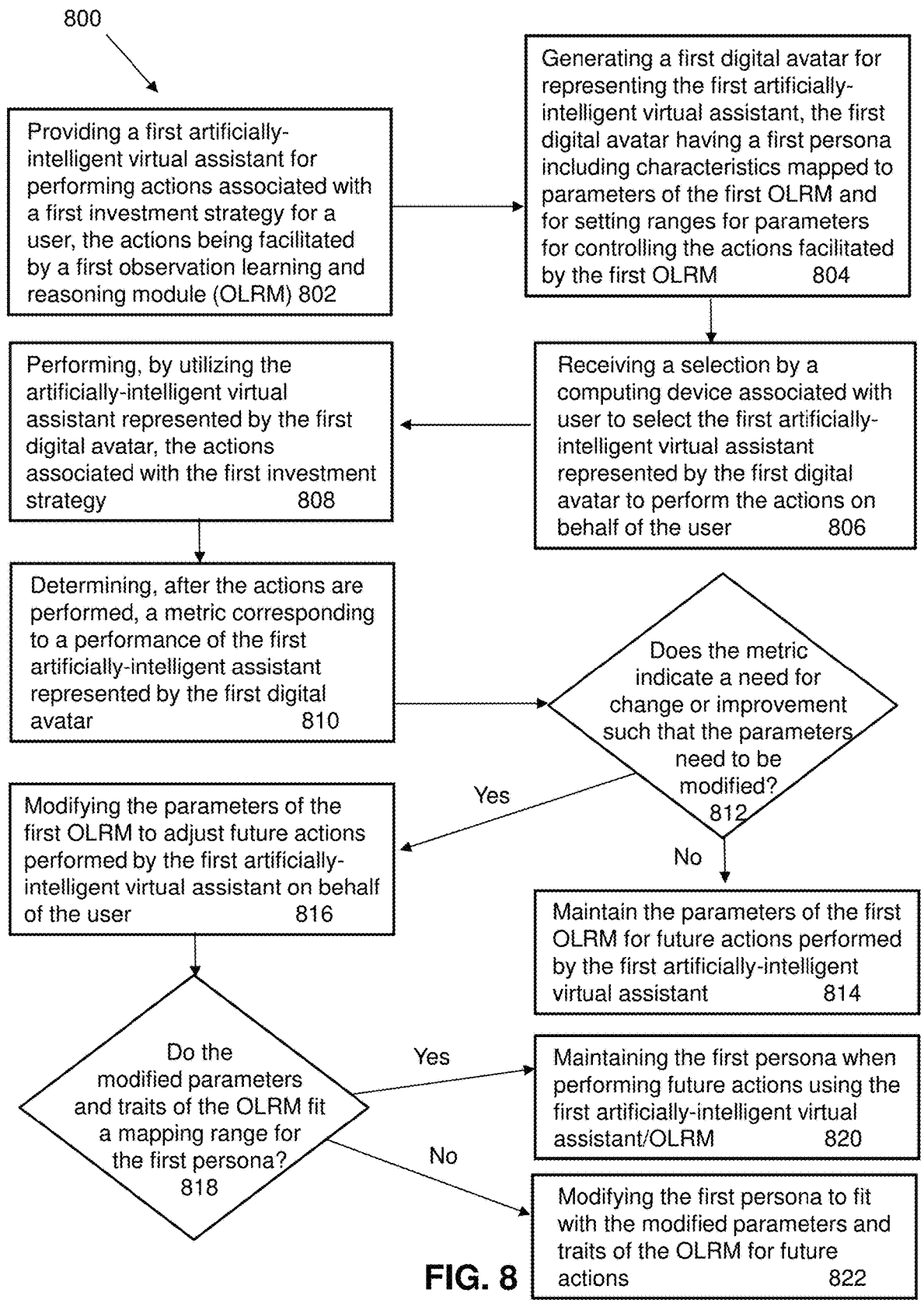
FIG. 8 is a flow diagram illustrating a sample method for utilizing an artificially-intelligent virtual assistant ("AIVA") and corresponding digital avatar with its accompanying persona to perform actions relating to an investment strategy for a user according to an embodiment of the present disclosure.

As shown in FIG. 8, an exemplary method 800 for providing a persona-driven and artificially-intelligent avatar and associated virtual assistant that performs actions on behalf of a user or device is schematically illustrated. For the purposes of method 800, a user, such as first user 101, or a device, such as first user device 102, may be interested in choosing an investment strategy for investing funds and other assets owned or under the control of the user and/or device. Of course, the method 800 may be utilized for performing any actions on behalf of the user or device in any context in which the user or device may need assistance, and the method 800 is not intended to be limited to the investment context. The method 800 may include, at step 802, generating and/or providing a first AIVA that may be configured to perform actions on behalf of a user or even a device, program, or system. The functionality of the first virtual assistant may be facilitated by and/or supported by a first OLRM 204a or even by multiple OLRMs 204a-z, which may consist of observation modules and learning and reasoning modules. At step 802, the method 800 may also include generating any number of additional AIVAs in addition to the first AIVA. In certain embodiments, the virtual assistants, implemented via the OLRMs 204a-z, may monitor, such as by using the observation modules, various sources of data and types of data, retrieve the data, and save the data in a database 155 after pre-processing the data. For example, for the investment context, the OLRMs 204a-z may monitor certain data relating to market indicators (e.g. investment-related indicators), events, and social networks, and retrieve and store such data. In certain embodiments, the OLRMs 204a-z may acquire indicators such as, but not limited to, an investment instrument price, trading volume, macroeconomic indicators, microeconomic indicators, any type of indicators, or any combination thereof. In certain embodiments, the OLRMs 204a-z may monitor news and political policies, gather social media posts, comments, tags, and search engine keywords from various networks, such as, but not limited to, social media networks. The OLRMs 204a-z may pre-process all gathered and accessed data using methods including, but not limited to, LSTM networks, recurrent neural networks, ANNs, DNNs, any type of neural network or other machine learning system, or any combination thereof. In certain embodiments, depending on the specific parameters, traits, and/or characteristics of the persona of an avatar representing the AIVA, different information sources may be monitoring by the OLRMs 204a-z and different pre-processing methods may be utilized. Once the OLRMs 204a-z process the data, the data may be imported into one or more databases, such as database 155. In certain embodiments, the generating and/or providing of the AIVAs may be performed and/or facilitated by utilizing the first user device 102, the second user device 111, the OLRMs 204a-z, the server 140, the server 150, the server 160, the communications network 135, any combination thereof, or by utilizing any other appropriate program, network, system, or device.

In certain embodiments, the learning and reasoning modules of the OLRMs 204a-z of the virtual assistants may be configured to train and update a variety of models of the OLRMs 204a-z to seek patterns, anomalies, relationships, and correlations within and between the datasets imported from the database 155. For example, in one embodiment, the learning and reasoning modules of the OLRMs 204a-z may train, test, and refine models on the pre-processed data such as, but not limited to, market indicators and social network data obtained by the observations modules by utilizing various unsupervised machine learning methodologies. The machine learning methodologies may include, but are not limited to, reinforcement learning and deep learning. In certain embodiments, the learning and reasoning modules may provide market trend prediction and sentiment analysis, develop investment strategies based on the trained models, and update the strategies by re-training the models based on the monitored performance results of the virtual assistants when performing actions on behalf of a user or device. In certain embodiments, for each avatar, different models, different machine learning methods, and different strategy development methodologies may be utilized in accordance with the parameters, traits, and/or characteristics of the persona of the avatar representing a particular virtual assistant.

At step 804, the method 800 may include generating a first digital avatar 202a to represent the first AIVA provided in step 802. Additionally, other digital avatars 202b-z may be generated to represent other AIVAs generated in step 802. In certain embodiments, the first digital avatar 202a may have a first persona including characteristics, parameters, traits, and/or features mapped to parameters of the first OLRM 204a, such as by utilizing a mapping function of the system 100. In certain embodiments, the characteristics, parameters, traits and/or features of the first persona of the first digital avatar 202a may be utilized to set ranges for the parameters of the first OLRM 204a for controlling the actions performed and/or facilitated by the first OLRM 204a for the first virtual assistant. Similarly, the other digital avatars 202b-z may have corresponding personas that are mapped to parameters of their corresponding OLRMs 204b-z. In certain embodiments, the generating of the first digital avatar 202a (and other digital avatars 202b-z) may be performed and/or facilitated by utilizing the first user device 102, the second user device 111, the OLRMs 204a-z, the server 140, the server 150, the server 160, the communications network 135, any combination thereof, or by utilizing any other appropriate program, network, system, or device. At step 806, the method 800 may include providing the first digital avatar 202a, along with any other digital avatars 202b-z, to a computing device (e.g. first user device 102 and/or second user device 111) for selection by a user and/or device. For example, the first digital avatar 202a and any other digital avatars 202b-z may be visually rendered on a mobile application or a web page utilized by a user of the system 100. In certain embodiments, the digital avatars 202a-z may be presented to the user as audio, video, any type of media content, or any combination thereof. At step 806, the method may also include receiving the selection of a particular digital avatar 202a-z for performing actions on behalf of the user and/or device. For the purposes of this method 800, the user or device may select the first digital avatar 202a from a plurality of digital avatars 202a-z presented to the user or device. In certain embodiments, the selection of the digital avatars 202a-z may be performed and/or facilitated by utilizing the first user device 102, the second user device 111, the OLRMs 204a-z, the server 140, the server 150, the server 160, the communications network 135, any combination thereof, or by utilizing any other appropriate program, network, system, or device.

At step 808, the method 800 may include performing, by utilizing the first AIVA represented by the first digital avatar 202a selected by the user and/or device at step 806, actions associated with a first investment strategy for the user or device that selected the first digital avatar 202a. The characteristics and actions of the first investment strategy may be set or defined by the characteristics of the persona of the first digital avatar 202 and/or the first AIVA implemented via the first OLRM 204a. For example, in the investment context, the actions may include, but are not limited to, performing a trade, purchasing a product, communicating with other digital avatars 202b-z to obtain additional information, obtaining data from data sources to assist with implementing and shaping the first investment strategy, making recommendations for investments to be purchased under the first investment strategy, communicating with the user or device that selected with first digital avatar 202a, any other action, or a combination thereof. In certain embodiments, the actions and/or behaviors may be performed by utilizing one or more behavior modules 206a-z. The behavior modules 206a-z may, for example, conduct a trade, buy a product, communicate with other digital avatars 202b-z, etc. In certain embodiments, the behavior modules 206a-z may be standalone modules, however, in certain embodiments, the behavior modules 206a-z may reside within the OLRMs 204a-z. In certain embodiments, actions may be performed and/or facilitated by utilizing the first user device 102, the second user device 111, the OLRMs 204a-z, the server 140, the server 150, the server 160, the communications network 135, any combination thereof, or by utilizing any other appropriate program, network, system, or device.

At step 810, method 800 may include determining, after the actions are performed or even while the actions are being performed, one or more metrics 208 corresponding to the performance of the first AIVA represented by the first digital avatar 202a. For example, in the investment context, the metric 208 may correspond to a trading return achieved based on executing the first investment strategy, a percentage of financial loss or gain associated with executing the first investment strategy, amounts of money that were utilized to purchase certain investments under the first investment strategy, a volatility value associated with prices of investments made under the first investment strategy, a risk value associated with investments made under the first investment strategy, any metric 208 corresponding the performance of the first AIVA, or any combination thereof. In certain embodiments, the metrics 208 may be obtained and analyzed by the behavior modules 206a-z, which may determine whether the actions conducted by the digital avatars 202a-z and/or OLRMs 204a-z were good, bad, mediocre, or qualified as something else. In certain embodiments, metrics 208 may be determined by utilizing the first user device 102, the second user device 111, the OLRMs 204a-z, the server 140, the server 150, the server 160, the communications network 135, any combination thereof, or by utilizing any other appropriate program, network, system, or device. The metrics 208 may be fed back, such as by utilizing the behavior modules 206a-z, to the first OLRM 204a corresponding to the first digital avatar 202a. At step 812, the method 800 may include determining if the metrics 208 indicate a need for change or improvement such that the parameters of the first OLRM 204a that dictate the actions performed by the first AIVA need to be modified. In certain embodiments, the determining may be performed and/or facilitated by utilizing the first user device 102, the second user device 111, the OLRMs 204a-z, the server 140, the server 150, the server 160, the communications network 135, any combination thereof, or by utilizing any other appropriate program, network, system, or device.

If at step 812, the metric(s) 208 indicates that there is no need for change or improvement such that the parameters of the first OLRM 204a do not need to be modified, the method 800 may include, at step 814, maintaining the parameters of the first OLRM 204a for future actions to be performed by the first AIVA, such as for the first investment strategy. In certain embodiments, the maintaining of the parameters may be facilitated by utilizing the first user device 102, the second user device 111, the OLRMs 204a-z, the server 140, the server 150, the server 160, the communications network 135, any combination thereof, or by utilizing any other appropriate program, network, system, or device. If, however, at step 812, the metric(s) 208 indicates a need for change or improvement such that the parameters of the first OLRM 204a do need to be modified or adjusted to improve performance or for other reasons, the method 800 may include, at step 816, modifying the parameters of the first OLRM 204a so as to adjust future actions performed by the first AIVA on behalf of the user or device. In doing so, the modified parameters may effectively modify the first investment strategy to create a new investment strategy corresponding to the modified parameters or simply create a new version of the first investment strategy that is tweaked for higher performance. For example, when modifying the parameters of the first OLRM 204*a*, this may lead to modifying weights of parameters associated with selecting data sources for obtaining information for implementing the investment strategy, modifying model selection weight parameters, modifying a training frequency for the models utilizing by the first OLRM 204*a*, adjusting a training dataset size for training the models, utilizing hyper-parameters in the models, modifying classes of investment options to be utilized by the first OLRM 204*a*, modifying parameters that may affect the investment strategy, or any combination thereof. In certain embodiments, the modifying may be performed by utilizing the first user device 102, the second user device 111, the OLRMs 204*a-z*, the server 140, the server 150, the server 160, the communications network 135, any combination thereof, or by utilizing any other appropriate program, network, system, or device.

As a more specific example, if the first digital avatar 202*a* is visually rendered as a 20-year old woman, whose persona has characteristics that indicate she has a high degree of openness, a moderate level of conscientiousness, a high level of extroversion, a low level of agreeableness, a moderate level of neuroticism, and that she loves outdoor adventurous activities, such as hunting, the first OLRM 204*a* represented by the first digital avatar 202*a* may have chased forex signals the same way that she would as a hunter when executing the first investment strategy. If the metrics 208 associated with the OLRM 204*a* indicate that there was a trading loss after executing the first investment strategy based on the persona, the OLRM 204*a* may reduce the weights of the data sources which have negative impacts on trading return and increase the weights of the data sources that have a positive impact on trading return. Because the persona of the first digital avatar 202*a* may have a low agreeableness value, the virtual assistant corresponding to the first digital avatar 202*a* may vary its parameters in a small range rather than change the parameters in a larger range to mimic other digital avatars 202*b-z* and their corresponding OLRMs 204*b-z* that may have better investment performance. In certain embodiments, the weights ascribed to the models used by the first OLRM 204*a* may change in the same way as the change in the data sources, such as if there is a trading loss. The first OLRM 204*a* may continue to use many indicators and models and may continue to be aggressive due to the first digital avatar's 202*a* high levels of openness and extroversion and the first digital avatar's 202*a* adventurous nature.

At step 818, the method 800 may include determining if the modified parameters of the first OLRM 204*a* associated with the first AIVA fit a mapping range for the first persona of the first digital avatar 202*a*. In certain embodiments, the determining may be performed and/or facilitated by utilizing the first user device 102, the second user device 111, the OLRMs 204*a-z*, the server 140, the server 150, the server 160, the communications network 135, any combination thereof, or by utilizing any other appropriate program, network, system, or device. The mapping range may correspond to a range of values corresponding to parameters, characteristics, features, and/or traits of a persona, which may be mapped to parameters and/or characteristics of an OLRM 204*a-z*. The values may be on a scale from 1-5 (or any other suitable scale), where 1 is the lowest level for exhibiting the particular characteristic and 5 is the highest level for exhibiting the particular characteristic. For example, if the first digital avatar 202*a* is visually rendered as a 70-year old woman who is a math and economics PhD, the first digital avatar 202*a* may have characteristics indicating a value of 2 for openness, a value of 3 for conscientiousness, a value of 4 for extraversion, a value of 3 for agreeableness, and a value of 2 for neuroticism. The OLRM 204*a* associated with the first digital avatar 202*a* may have parameters mapped to the characteristics of the first digital avatar 202*a*. For example, using the example, above and based on the values for the characteristics of the first digital avatar 202*a*, the OLRM 204*a* may utilize more conservative models (e.g. moving average or momentum) when implementing investment strategies, may perform actions such as trading in only one market, may follow plans relating to an investment strategy diligently, may perform trades based on a long-term horizon rather than short-term trades, may trade or perform actions without the assistance of other digital avatars 202*b-z*, may have a calm reaction when dealing with losses, and may observe market information for a long duration before executing actions relating to an investment strategy. In certain embodiments, values may be assigned to the parameters for the OLRM 204*a*, such as using a scale similar to the scale utilized for the persona.

If, at step 818, the determining indicates that the modified parameters of the first OLRM 204*a* fit within the mapping range for the first persona of the first digital avatar 202*a*, the method 800 may include proceeding to step 820. At step 820, the method 800 may include maintaining the first persona of the first digital avatar 202*a* when performing future actions using the first AIVA supported by the first OLRM 204*a*. Maintaining the first persona may mean maintaining the parameters, traits, and/or characteristics of the first persona such that the first persona may behave and/or operate in a similar or same manner as the first persona behaved during steps 804-808. If, however, at step 818, the determining indicates that the modified parameters of the first OLRM 204*a* no longer fit within the mapping range for the first persona of the first digital avatar 202*a*, the method 800 may include proceeding to step 822. At step 822, the method 800 may include modifying the parameters, traits, and/or characteristics of the first persona of the first digital avatar 202*a* to fit and/or map with the modified parameters and/or traits of the first OLRM 204*a*. As a result, future actions to be performed on behalf of a user or device may be adjusted in accordance with the changes to the first persona and the first OLRM 204*a* supporting the first AIVA. In certain embodiments, the modifying of the parameters, traits, and/or characteristics may be performed and/or facilitated by utilizing first user device 102, the second user device 111, the OLRMs 204*a-z*, the server 140, the server 150, the server 160, the communications network 135, any combination thereof, or by utilizing any other appropriate program, network, system, or device. Notably, the method 800 may further incorporate any of the features and functionality described for the system 100 or as otherwise described herein.

The systems and methods disclosed herein may include additional functionality and features. For example, in certain embodiments, an association and/or communication link (e.g. direct communication link) between a persona of a digital avatar 202*a-z* and its corresponding OLRM 204*a-z* may be removed or disconnected. In certain embodiments, by doing so, the ranges set for the parameters for controlling the actions of the OLRM 204*a-z* may no longer need to be ranged bounded by the characteristics of the persona of the digital avatar 202*a-z*. In certain embodiments, once the association and/or communication link between the persona of the digital avatar 202a-z and the corresponding OLRM 204a-z are removed, a human agent (e.g. first user 101 or second user 110) may optionally be substituted in for the persona such that the human agent may control the parameters of the OLRM 204a-z and/or range bound the parameters of the OLRM 204a-z. In such a scenario, the human agent may affect the actions performed by an AIVA on behalf of a user or even a device, program, and/or system. In certain embodiments, once the association and/or communication link between the persona of the digital avatar 202a-z and the corresponding OLRM 204a-z are removed, a human agent (e.g. first user 101 or second user 110) may optionally serve as the link or as an intermediary between the persona of a digital avatar 202 a-z and the corresponding OLRM 204a-z. In such a scenario, the persona of the digital avatar 202a-z may guide the human agent to adjust the parameters of the corresponding AIVAs and/or OLRMs 204a-z. For example, the persona of the digital avatar 202a-z may provide recommendations to the human agent for adjusting the parameters of the AIVAs and/or OLRMs 204a-z, and the human agent can choose to adopt or reject the recommendations. In certain embodiments, the system 100 may enable the human agent to modify the characteristics of the persona of the digital avatar 202a-z, and the system 100 may then enable the persona of the digital avatar 202a-z with the modified characteristics to modify the parameters for controlling the actions facilitated by the OLRMs 204a-z and/or virtual assistants based on the modified characteristics of the persona. Also, in certain embodiments, the human agent may map the characteristics of the personas of the digital avatars 202a-z to the parameters of the corresponding AIVA and/or OLRMs 204a-z.

In certain embodiments, the systems and methods may also be configured to operate in any context or use-case scenario in which a user or device may need or desire assistance or may desire actions to be performed on behalf of the user or device. For example, the digital avatars 202a-z, AIVAs, and/or OLRMs 204a-z may operate in a personal shopper use-case scenario. For example, an AIVA may serve as a virtual personal shopper that may perform actions on behalf of a user, such as recommending products and/or services to the user and purchasing products and/or services on behalf of the user. In order to do so, the AIVA, through the use of a digital avatar 202a-z, may participate in question and answering sessions with the user to determine what the user's preferences are. In certain embodiments, the AIVA may access the user's purchase history or a user profile of the user to optimize the generation of recommendations for products and/or services. In certain embodiments, a user of device may have the option of selecting from a plurality of virtual personal shoppers, each having its own persona and avatar, which may perform different actions based on the persona and based on the parameters of their corresponding OLRMs 204a-z. In certain embodiments, certain virtual personal shoppers may be configured to specialize in certain markets, products, and/or services. In certain embodiments, multiple virtual personal shoppers may operate in the same markets and may have different recommendations and actions based on their personas. In certain embodiments, the virtual personal shoppers may optionally adapt to the persona and habits of the user using the virtual personal shoppers, however, in other embodiments, the virtual personal shoppers may not adapt to the persona and habits of the user. In certain embodiments, the system and methods may include generating virtual personal shoppers that have characteristics and personas that correspond with characteristics of a user or device that may use the virtual personal shoppers.

As another example, the digital avatars 202a-z, AIVAs, and/or OLRMs 204a-z may operate in an academic tutoring use-case scenario. For example, an AIVA may serve as a virtual tutor that may perform actions on behalf of a user, such as utilizing certain teaching methods and styles that may facilitate a user's learning of a particular subject. In certain embodiments, the virtual tutor may even be configured to generate teaching presentations, study aids, and tests for the users that are specifically geared to the user's capabilities, knowledge and/or learning style. As a further example, the digital avatars 202a-z, AIVAs, and/or OLRMs 204a-z may operate as a video game assistant. For example, an AIVA may serve as a virtual game assistant that may perform actions on behalf of a user, such as while the user is playing a video game. The virtual game assistant may perform actions, such as assisting the user with objectives in the video game, acting as a second cooperative player in the game, assisting the user with completion of the game, assisting the user with learning functionality of the game, any other assistance, or any combination thereof. As yet another example, the digital avatars 202a-z, AIVAs, and/or OLRMs 204a-z may operate as a vehicle assistant for a driverless or autonomous vehicle. The vehicle assistant perform actions on behalf of a user, such as providing recommendations for places to visit, providing recommendations for exits to take, providing recommendations for different routes to a particular location, adjusting the driving dynamics and performance of the vehicle based on the user's personality, instructing the user about the vehicle's functionality and features, along with any other actions.

As a further example, the digital avatars 202a-z, AIVAs, and/or OLRMs 204a-z may operate as a management consultant, such as a C-suite management consultant. The management consultant may recommend employees for a particular project, recommend courses of action to take to accomplish an objective of a business, recommend cost-cutting initiatives, recommend ways in which tasks performed during a work day can be optimized, or any other management-related recommendations or actions. As yet a further example, the digital avatars 202a-z, AIVAs, and/or OLRMs 204a-z may operate as a social networking assistant. The social network assistant may perform actions, such as protecting a user's privacy on a social network, providing recommendations as to what content to share with other users on the social network, monitoring requests to become friends with the user, monitoring when a friend disconnects from the user's social network, providing recommendations as to potential friends that the user may want to become friends with, perform any other actions, or a combination thereof. In yet a further example, the digital avatars 202a-z, the AIVAs, and/or OLRMs 204a-z may be components of a robot, an animatronic device, a computing system, a communications network, an artificial-intelligence system, any type of process, or any combination thereof. In further embodiments, users may directly dictate the parameters and characteristics of the personas and OLRMs 204a-z and control the digital avatars 202a-z. For example, the system 100 may enable a user to modify or alter the parameters and characteristics of the personas and may enable the user to modify the parameters of the OLRMS 204a-z via a software application executing on the first user device 102.

The systems and methods disclosed herein may include further functionality and features. For example, the operative functions of the system 100 and method may be configured to execute on a special-purpose processor specifically configured to carry out the operations provided by the system 100 and method. For example, in certain embodiments, each digital avatar 202a-z and/or OLRM 204a-z may be configured to execute on its own special-purpose processor. In other embodiments, groups of the digital avatars 202a-z and/or OLRMs 204a-z may be configured to execute on selected special-purpose processors. Notably, the operative features and functionality provided by the system 100 and method may increase the efficiency of computing devices that are being utilized to facilitate the functionality provided by the system 100 and method 800. For example, as the digital avatars 202a-z and OLRMs 204a-z acquire data and perform actions over time, the digital avatars 202a-z and OLRMs 204a-z can optimize the performance of future actions through machine learning, such that a reduced amount of computer operations need to be performed by the devices in the system 100 using the processors and memories of the system 100 than in systems that are not capable of machine learning as described in this disclosure. In such a context, less processing power may need to be utilized because the processors and memories do not need to perform actions, operations, and analyses that have already been conducted by the system 100. As a result, there are substantial savings in the usage of computer resources by utilizing the software, functionality, and algorithms provided in the present disclosure.

Notably, in certain embodiments, various functions and features of the system 100 and methods may operate without human intervention and may be conducted entirely by computing devices, robots, programs, and/or processes. For example, in certain embodiments, multiple computing devices may interact with devices of the system 100 to provide the functionality supported by the system 100. Additionally, in certain embodiments, the computing devices, digital avatars 202a-z, and OLRMs 204a-z of the system 100 may operate continuously to reduce the possibility of errors being introduced into the system 100. In certain embodiments, the system 100 and methods may also provide effective computing resource management by utilizing the features and functions described in the present disclosure. For example, in certain embodiments, while performing certain actions on behalf of a user or device, a digital avatar 202a-z and/or OLRM 204a-z may specify a quantity of computer processor resources (e.g. processor clock cycles, processor speed, processor cache, etc.) that may be dedicated to obtaining data from data sources, performing actions, and performing any other operations conducted by the system 100, or any combination thereof. For example, the system 100, a digital avatar 202a-z, and/or OLRM 204a-z may indicate a quantity of processor cycles of a processor that may be utilized to obtain data, process obtained data, and/or specify a selected amount of processing power that may be dedicated to perform actions on behalf of a user or device. In certain embodiments, if digital avatar 202a and/or OLRM 204a is using a threshold amount of processing power of a certain processor, the digital avatar 202a or an OLRM 204a may recruit one or more other digital avatars 202b-z and/or OLRMs b-z executing on other processors to assist.

In certain embodiments, any device in the system 100 may transmit a signal to a memory device to cause the memory device to only dedicate a selected amount of memory resources to the various operations of the system 100. In certain embodiments, the system 100 and methods may also include transmitting signals to processors and memories to only perform the operative functions of the system 100 and methods at time periods when usage of processing resources and/or memory resources in the system 100 is at a selected and/or threshold value. In certain embodiments, the system 100 and methods may include transmitting signals to the memory devices utilized in the system 100, which indicate which specific portions (e.g. memory sectors, etc.) of the memory should be utilized to store any of the data utilized or generated by the system 100. Notably, the signals transmitted to the processors and memories may be utilized to optimize the usage of computing resources while executing the operations conducted by the system 100. As a result, such features provide substantial operational efficiencies and improvements over existing technologies.

Figure 9:
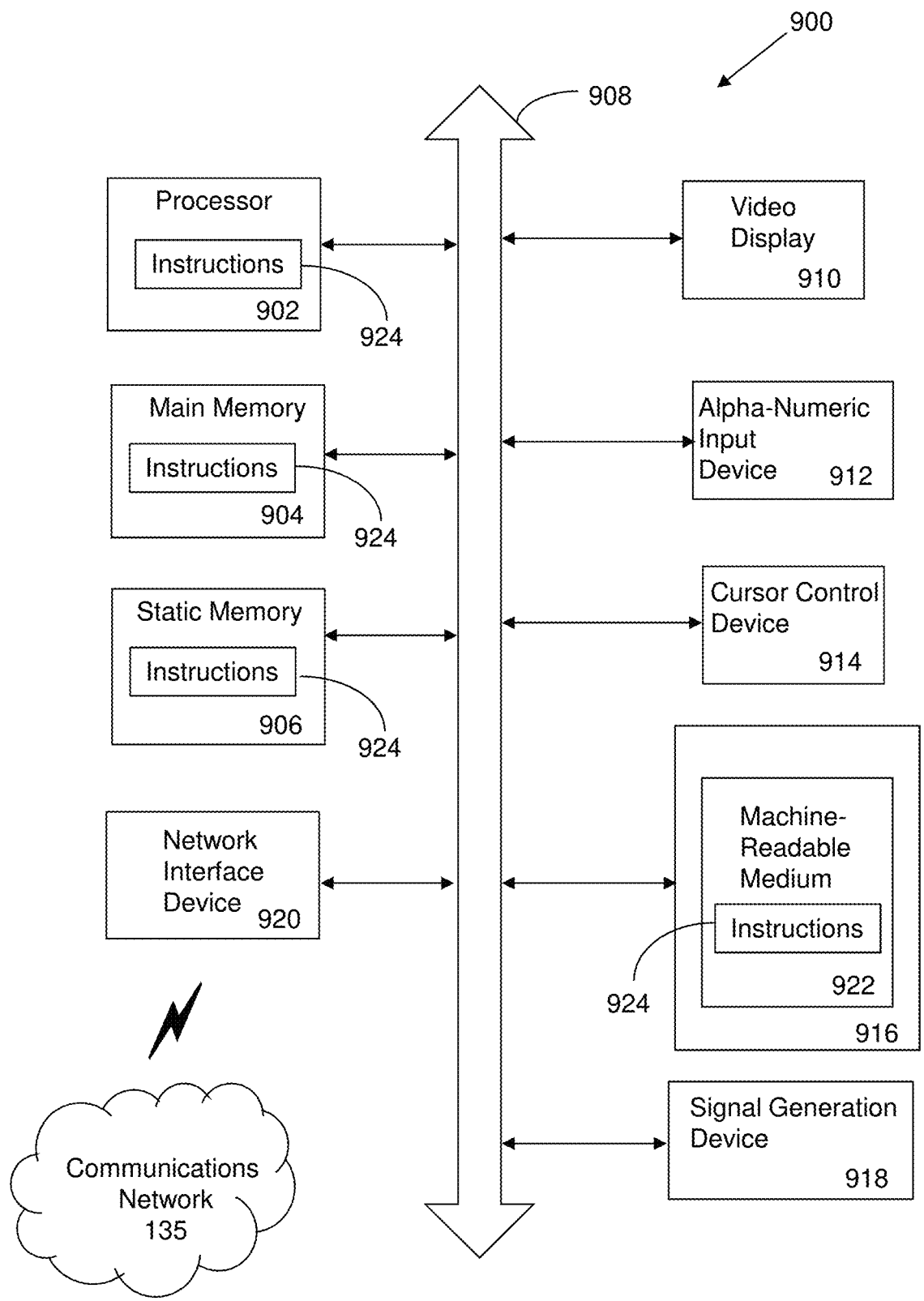
FIG. 9 is a schematic diagram of a machine in the form of a computer system within which a set of instructions, when executed, may cause the machine to perform any one or more of the methodologies or operations of the systems and methods for providing a persona-driven and artificially-intelligent avatar and associated virtual assistant that performs actions on behalf of a user or device.

Referring now also to FIG. 9, at least a portion of the methodologies and techniques described with respect to the exemplary embodiments of the system 100 can incorporate a machine, such as, but not limited to, computer system 900, or other computing device within which a set of instructions, when executed, may cause the machine to perform any one or more of the methodologies or functions discussed above. The machine may be configured to facilitate various operations conducted by the system 100. For example, the machine may be configured to, but is not limited to, assist the system 100 by providing processing power to assist with processing loads experienced in the system 100, by providing storage capacity for storing instructions or data traversing the system 100, or by assisting with any other operations conducted by or within the system 100.

In some embodiments, the machine may operate as a standalone device. In some embodiments, the machine may be connected (e.g., using communications network 135, another network, or a combination thereof) to and assist with operations performed by other machines and systems, such as, but not limited to, the first user device 102, the second user device 111, the server 140, the server 150, the database 155, the server 160, or any combination thereof. The machine may assist with operations performed by the avatars 202a-202z, avatars 502, 602, 702, the OLRMs 204a-204z, virtual assistants, any programs in the system, or any combination thereof. The machine may be connected with any component in the system 100. In a networked deployment, the machine may operate in the capacity of a server or a client user machine in a server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 900 may include a processor 902 (e.g., a central processing unit (CPU), a graphics processing unit (GPU, or both), a main memory 904 and a static memory 906, which communicate with each other via a bus 908. The computer system 900 may further include a video display unit 910, which may be, but is not limited to, a liquid crystal display (LCD), a flat panel, a solid state display, or a cathode ray tube (CRT). The computer system 900 may include an input device 912, such as, but not limited to, a keyboard, a cursor control device 914, such as, but not limited to, a mouse, a disk drive unit 916, a signal generation device 918, such as, but not limited to, a speaker or remote control, and a network interface device 920.

The disk drive unit 916 may include a machine-readable medium 922 on which is stored one or more sets of instructions 924, such as, but not limited to, software embodying any one or more of the methodologies or functions described herein, including those methods illustrated above. The instructions 924 may also reside, completely or at least partially, within the main memory 904, the static memory 906, or within the processor 902, or a combination thereof, during execution thereof by the computer system 900. The main memory 904 and the processor 902 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine-readable medium 922 containing instructions 924 so that a device connected to the communications network 135, another network, or a combination thereof, can send or receive voice, video or data, and communicate over the communications network 135, another network, or a combination thereof, using the instructions. The instructions 924 may further be transmitted or received over the communications network 135, another network, or a combination thereof, via the network interface device 920.

While the machine-readable medium 922 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that causes the machine to perform any one or more of the methodologies of the present disclosure.

The terms "machine-readable medium," "machine-readable device," or "computer-readable device" shall accordingly be taken to include, but not be limited to: memory devices, solid-state memories such as a memory card or other package that houses one or more read-only (non-volatile) memories, random access memories, or other re-writable (volatile) memories; magneto-optical or optical medium such as a disk or tape; or other self-contained information archive or set of archives is considered a distribution medium equivalent to a tangible storage medium. The "machine-readable medium," "machine-readable device," or "computer-readable device" may be non-transitory, and, in certain embodiments, may not include a wave or signal per se. Accordingly, the disclosure is considered to include any one or more of a machine-readable medium or a distribution medium, as listed herein and including art-recognized equivalents and successor media, in which the software implementations herein are stored.

The illustrations of arrangements described herein are intended to provide a general understanding of the structure of various embodiments, and they are not intended to serve as a complete description of all the elements and features of apparatus and systems that might make use of the structures described herein. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover any and all adaptations or variations of various embodiments and arrangements of the invention. Combinations of the above arrangements, and other arrangements not specifically described herein, will be apparent to those of skill in the art upon reviewing the above description. Therefore, it is intended that the disclosure not be limited to the particular arrangement(s) disclosed as the best mode contemplated for carrying out this invention, but that the invention will include all embodiments and arrangements falling within the scope of the appended claims.

The foregoing is provided for purposes of illustrating, explaining, and describing embodiments of this invention. Modifications and adaptations to these embodiments will be apparent to those skilled in the art and may be made without departing from the scope or spirit of this invention. Upon reviewing the aforementioned embodiments, it would be evident to an artisan with ordinary skill in the art that said embodiments can be modified, reduced, or enhanced without departing from the scope and spirit of the claims described below.

We claim:

1. A system, comprising:
   a memory that stores instructions; and
   a processor that executes the instructions to perform operations, the operations comprising:
     receiving, by a computing device from a user, a selection of an artificially-intelligent virtual assistant (AIVA) among a plurality of AIVAs to perform actions on behalf of the user,
     facilitating, with an observation learning and reasoning module (OLRM), actions and functionality of the AIVA,
     wherein the AIVA is associated with at least one personal shopper of a plurality of personal shoppers for a user and is represented by a digital avatar having a persona that includes characteristics that set ranges for parameters for controlling the actions of the AIVA facilitated by the OLRM, and wherein the plurality of AIVAs perform different actions based on the persona of the corresponding digital avatar and the parameters of the corresponding OLRM,
     performing, by utilizing the AIVA represented by the digital avatar, the actions associated with the personal shopper on behalf of the user, determining, after the actions are performed, a metric corresponding to a performance of the AIVA represented by the digital avatar, and modifying, based on the metric corresponding to the performance of the AIVA, parameters of the OLRM so as to adjust future actions performed by the AIVA on behalf of the user, wherein modifying the parameters of the OLRM comprises modifying parameters associated with: selecting a data source for obtaining information for implementing a modified version of the personal shopper.

2. The system of claim 1, wherein the operations further comprise determining, after modifying the parameters of the OLRM, and whether the modified parameters still correspond with the characteristics of the persona of the digital avatar.

3. The system of claim 2, wherein the operations further comprise modifying the characteristics of the persona of the digital avatar to correspond with the modified parameters.

4. The system of claim 3, wherein the operations further comprise modifying the characteristics of the persona of the digital avatar by modifying a personality of the digital avatar, an experience level of the digital avatar, an appearance of the digital avatar, an age of the digital avatar, demographic information for the digital avatar, psychographic information for the digital avatar, or any combination thereof.

5. The system of claim 1, wherein the metric corresponding to the performance of the AIVA includes feedback received from the user regarding an action performed by the AIVA represented by the digital avatar on behalf of the user.

6. The system of claim 5, wherein the operations further comprise modifying characteristics of the persona of the digital avatar utilizing the feedback.

7. The system of claim 1, wherein performing the actions associated with the personal shopper on behalf of the user comprise communicating with the user, assisting user in shopping for goods, generating a recommendation related to a product or service, purchasing a product or service on behalf of the user, processing input received from the user via the computing device, or a combination thereof.

8. The system of claim 1, wherein performing the actions associated with the personal shopper on behalf of the user comprises participating in a question and answering session with the user to determine what preferences of the user.

9. The system of claim 1, wherein performing the actions associated with the personal shopper on behalf of the user comprises generating a recommendation related to a product or service, and wherein the operations further comprise accessing purchase or profile history of the user to optimize generation of recommendations for products and/or services.

10. The system of claim 1, wherein the personal shoppers are configured to specialize in certain markets, products, and/or services.

11. The system of claim 1, wherein the computing device comprises a robot.

12. The system of claim 1, wherein the operations further comprise causing the digital avatar to be visually rendered on a graphical user interface of an application executing on the computing device.

13. A method, comprising:
generating, by utilizing instructions from a memory that are executed by a processor, a plurality of artificially-intelligent virtual assistants (AIVA), each for performing actions associated with at least one personal shopper of a plurality of personal shoppers for a user, wherein the actions and functionality are facilitated by an observation learning and reasoning module (OLRM), wherein each AIVA is represented by a digital avatar having a persona that includes characteristics that set ranges for parameters for controlling the actions of the AIVA facilitated by the OLRM, and wherein the plurality of AIVAs perform different actions based on the persona of the corresponding digital avatar and the parameters of the corresponding OLRM;

presenting to the user, with a computing device, a plurality of AIVAs;

receiving, with the computing device, a selection from a user of an AIVA represented by a digital avatar to perform actions on behalf of the user;

performing, by utilizing the AIVA represented by the digital avatar, the actions associated with the personal shopper on behalf of the user; and determining, after the actions are performed, a metric corresponding to a performance of the AIVA represented by the digital avatar, wherein the parameters of the OLRM are modified, wherein modifying the parameters comprises modifying parameters associated with selecting a data source for obtaining information for implementing a modified version of the personal shopper and adjusting a weight associated with selecting a model utilized by the OLRM.

14. The method of claim 13, wherein the metric corresponding to the performance of the AIVA includes feedback received from the user regarding an action performed by the AIVA represented by the digital avatar on behalf of the user.

15. The method of claim 13, wherein the operations further comprise modifying characteristics of the persona of the digital avatar utilizing the feedback.

16. The method of claim 13, wherein performing the actions associated with the personal shopper on behalf of the user comprise communicating with the user, assisting user in shopping for goods, generating a recommendation related to a product or service, purchasing a product or service on behalf of the user, processing input received from the user via the computing device, or a combination thereof.

17. The method of claim 13, wherein performing the actions associated with the personal shopper on behalf of the user comprises participating in a question and answering session with the user to determine what preferences of the user.

18. The method of claim 13, wherein performing the actions associated with the personal shopper on behalf of the user comprises generating a recommendation related to a product or service, and wherein the operations further comprise accessing purchase or profile history of the user to optimize generation of recommendations for products and/or services.

19. The method of claim 13, wherein the computing device comprises a robot.

20. A non-transitory computer-readable device comprising instructions, which when loaded and executed by a processor, cause the processor to perform operations comprising:
generating, by utilizing instructions from a memory that are executed by a processor, a plurality of artificially-intelligent virtual assistants (AIVA), each for performing actions associated with at least one personal shopper of a plurality of personal shoppers for a user, wherein the actions and functionality are facilitated by an observation learning and reasoning module (OLRM), wherein each AIVA is represented by a digital avatar having a persona that includes characteristics that set ranges for parameters for controlling the actions of the AIVA facilitated by the OLRM, and wherein the plurality of AIVAs perform different actions based on the persona of the corresponding digital avatar and the parameters of the corresponding OLRM;

presenting to the user, with a computing device, a plurality of AIVAs;

receiving, with the computing device, a selection from a user of an AIVA represented by a digital avatar to perform actions on behalf of the user;

performing, by utilizing the AIVA represented by the digital avatar, the actions associated with the personal shopper on behalf of the user; and determining, after the actions are performed, a metric corresponding to a performance of the AIVA represented by the digital avatar, wherein the parameters of the OLRM are modified, wherein modifying the parameters comprises modifying parameters associated with selecting a data source for obtaining information for implementing a modified version of the personal shopper.

* * * * *